US010237103B2

United States Patent
Manolakos et al.

(10) Patent No.: US 10,237,103 B2
(45) Date of Patent: Mar. 19, 2019

(54) CHANGING CYCLIC PREFIX (CP) LENGTH BASED ON PRECODER MODE SELECTION

(71) Applicant: QUALCOMM Incorporated, San Diego, CA (US)

(72) Inventors: Alexandros Manolakos, San Diego, CA (US); Tingfang Ji, San Diego, CA (US); June Namgoong, San Diego, CA (US); Joseph Binamira Soriaga, San Diego, CA (US)

(73) Assignee: QUALCOM Incorporated, San Diego, CA (US)

( * ) Notice: Subject to any disclaimer, the term of this patent is extended or adjusted under 35 U.S.C. 154(b) by 115 days.

(21) Appl. No.: 15/078,087

(22) Filed: Mar. 23, 2016

(65) Prior Publication Data

US 2017/0149591 A1     May 25, 2017

Related U.S. Application Data

(60) Provisional application No. 62/259,446, filed on Nov. 24, 2015.

(51) Int. Cl.
*H04L 27/26* (2006.01)
*H04L 5/00* (2006.01)
(Continued)

(52) U.S. Cl.
CPC ....... *H04L 27/2607* (2013.01); *H04B 7/0482* (2013.01); *H04B 7/0619* (2013.01); (Continued)

(58) Field of Classification Search
CPC ................ H04B 7/0456; H04B 7/0482; H04L 25/03898; H04L 25/03949; H04L 27/2678; H04L 27/2695
See application file for complete search history.

(56) References Cited

U.S. PATENT DOCUMENTS

2012/0236967 A1* 9/2012 Hui ..................... H04L 27/3405
                                                              375/298
2013/0039401 A1* 2/2013 Han ..................... H04B 7/0617
                                                              375/222

(Continued)

OTHER PUBLICATIONS

Malkin M., et al., "Transmitter Precoding for Insufficient Cyclic-Prefix Distortion in Multicarrier Systems", Vehicular Technology Conference, VTC Spring 2008, IEEE, Piscataway, NJ, USA, May 11, 2008 (May 11, 2008), pp. 1142-1146.*

(Continued)

*Primary Examiner* — Salvador E Rivas
(74) *Attorney, Agent, or Firm* — Loza & Loza, LLP

(57) ABSTRACT

Aspects provide for selecting a precoder mode for a transmission, changing a cyclic prefix (CP) length based on the selected precoder mode, and transmitting a signal that includes the changed CP length. Changing the CP length may involve using the selected precoder mode to lookup a value by which to change a nominal CP length. After changing the CP length, information indicating the changed CP length may be transmitted to a receiver of the signal. Precoder mode selection may be based on feedback information that indicates whether a receiver requests a change to the CP length. Precoder mode selection may be based on a received reference signal that indicates a condition of a communication channel. The reference signal may be used to select the precoder mode that results in the smallest relative delay spread, the largest relative delay spread compression, the largest relative beamforming gain, and/or the largest relative throughout.

27 Claims, 13 Drawing Sheets

(51) Int. Cl.
H04B 7/06 (2006.01)
H04B 7/0456 (2017.01)

(52) U.S. Cl.
CPC .......... *H04L 5/0016* (2013.01); *H04L 5/0026* (2013.01); *H04L 5/0048* (2013.01); *H04L 27/2695* (2013.01); *H04B 7/0665* (2013.01); *H04L 27/2678* (2013.01)

(56) References Cited

U.S. PATENT DOCUMENTS

2014/0040985 A1* 2/2014 Wang .................... H04W 12/06
726/3
2016/0233939 A9* 8/2016 Hammarwall ....... H04B 7/0634

OTHER PUBLICATIONS

International Search Report and Written Opinion—PCT/US2016/059478—ISA/EPO—dated Jan. 19, 2017.
Malkin M., et al., "Transmitter Precoding for Insufficient Cyclic-Prefix Distortion in Multicarrier Systems", Vehicular Technology Conference, VTC Spring 2008, IEEE, Piscataway, NJ, USA, May 11, 2008 (May 11, 2008), pp. 1142-1146, XP031255706, ISBN: 978-1-4244-1644-8.

* cited by examiner

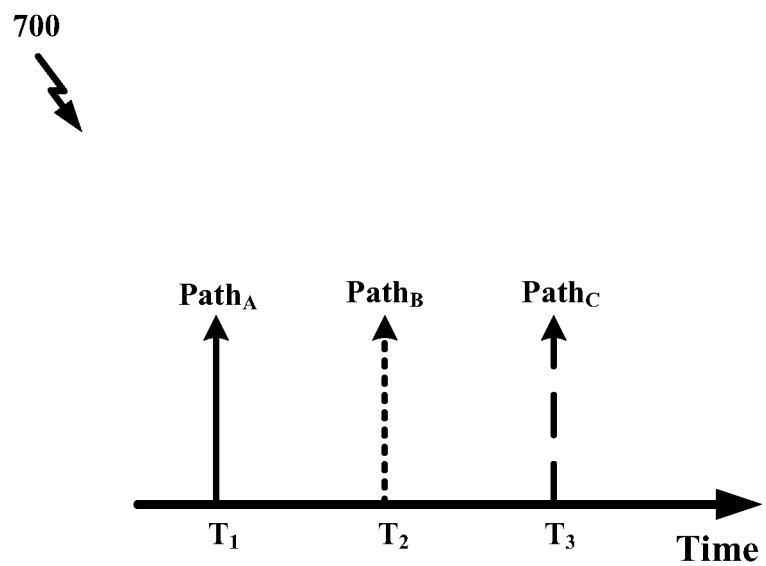
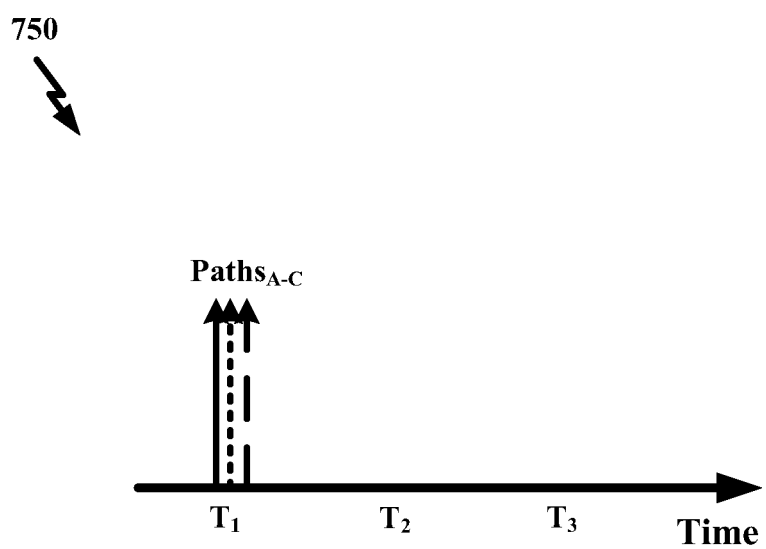
FIG. 7

US 10,237,103 B2

CHANGING CYCLIC PREFIX (CP) LENGTH BASED ON PRECODER MODE SELECTION

CROSS-REFERENCE TO RELATED APPLICATION

This application claims priority to and benefit of provisional patent application No. 62/259,446 filed in the United States Patent and Trademark Office on Nov. 24, 2015, the entire content of which is hereby incorporated herein by reference.

TECHNICAL FIELD

Aspects of the present disclosure relate, generally, to wireless communication systems and, more particularly, to changing the cyclic prefix (CP) length based on precoder mode selection.

BACKGROUND

Wireless communication networks are widely deployed to provide various communication services such as telephony, video, data, messaging, broadcasts, and so on. Such networks, which are usually multiple access networks, support communication for multiple users by sharing the available network resources. Within such wireless networks a variety of data services may be provided, including voice, video, and emails. The spectrum allocated to such wireless communication networks can include licensed spectrum and/or unlicensed spectrum. Licensed spectrum is generally restricted in its use for wireless communication except for licensed use as regulated by a governmental body or other authority within a given region. Unlicensed spectrum is generally free to use, within limits, without the purchase or use of such a license. As the demand for mobile broadband access continues to increase, research and development continue to advance wireless communication technologies to meet the growing demand for mobile broadband access and to enhance the overall user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one aspect, the present disclosure provides an apparatus for wireless communication. The apparatus includes a transceiver, a memory, and at least one processor communicatively coupled to the transceiver and the memory. The at least one processor may be configured to select a precoder mode for a transmission. The at least one processor may be further configured to change a cyclic prefix (CP) length based on the selected precoder mode. The at least one processor may be further configured to utilize the transceiver to transmit a signal that includes the changed CP length.

In another aspect, the present disclosure provides a method for wireless communication. The method may include selecting a precoder mode for a transmission. The method may also include changing a CP length based on the selected precoder mode. The method may also include transmitting a signal that includes the changed CP length.

In yet another aspect, the present disclosure provides a computer-readable medium storing computer-executable code. The computer-executable code may include instructions configured to select a precoder mode for a transmission. The instructions may be further configured to change a CP length based on the selected precoder mode. The instructions may be further configured to transmit a signal that includes the changed CP length.

In a further aspect of the present disclosure, the present disclosure provides an apparatus for wireless communication. The apparatus may include means for selecting a precoder mode for a transmission. The apparatus may also include means for changing a CP length based on the selected precoder mode. The apparatus may also include means for transmitting a signal that includes the changed CP length.

These and other aspects of the present disclosure will become more fully understood upon a review of the detailed description, which follows. Other aspects, features, and embodiments of the present disclosure will become apparent to those of ordinary skill in the art, upon reviewing the following description of specific, exemplary embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 7 illustrates diagrams showing examples of times at which signals arrive at the subordinate entity according to aspects of the present disclosure.

DESCRIPTION OF SOME EXAMPLES

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, certain structures and components are shown in block diagram form in order to avoid obscuring such concepts.

The concepts presented throughout this disclosure may be implemented across a broad variety of telecommunication systems, network architectures, and communication standards. The 3rd Generation Partnership Project (3GPP) is a standards body that defines several wireless communication standards for networks involving an evolved packet system (EPS), which may sometimes be referred to as long-term evolution (LTE) network. In an LTE network, packets may utilize the same or similar latency targets. As such, an LTE network may provide a one-size-fits-all latency configuration. Evolved versions of an LTE network, such as a fifth-generation (5G) network, may provide many different types of services and/or applications (e.g., web browsing, video streaming, VoIP, mission critical applications, multi-hop networks, remote operations with real-time feedback, tele-surgery, and others). The concepts presented throughout this disclosure may additionally or alternatively be implemented across a broad variety of wireless local area networks (WLANs) and corresponding communication standards (e.g., standards promulgated by the Institute of Electrical and Electronics Engineers (IEEE), such as IEEE 802.11).

Figure 1:
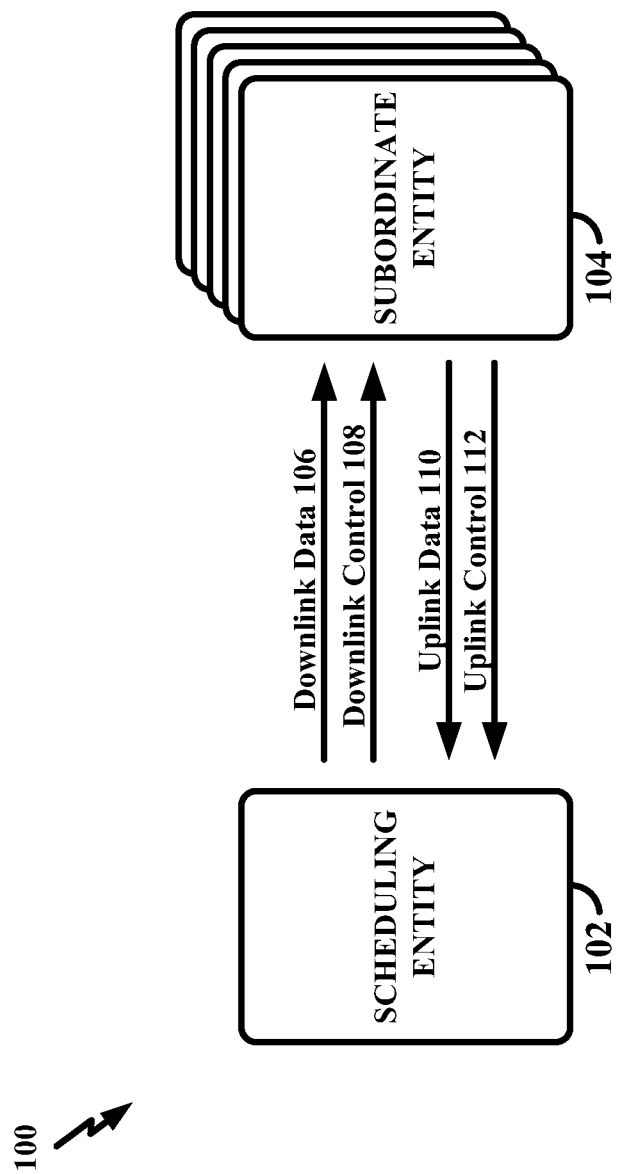
FIG. 1 illustrates a diagram showing an example of various communications between a scheduling entity and one or more subordinate entities according to aspects of the present disclosure.

FIG. 1 illustrates a diagram 100 showing an example of various communications between a scheduling entity 102 and one or more subordinate entities 104 according to aspects of the present disclosure. Broadly, the scheduling entity 102 is a node or device responsible for scheduling traffic in a wireless communication network, including various downlink (DL) and uplink (UL) transmissions. The scheduling entity 102 may sometimes be referred to as a scheduler, and/or any other suitable term without deviating from the scope of the present disclosure. The scheduling entity 102 may be, or may reside within, a base station, a base transceiver station, a radio base station, a radio transceiver, a transceiver function, a basic service set, an extended service set, an access point, a Node B, a user equipment (UE), a mesh node, a relay, a peer, and/or any other suitable device.

Broadly, the subordinate entity 104 is a node or device that receives scheduling and/or control information, including but not limited to scheduling grants, synchronization or timing information, or other control information from another entity in the wireless communication network, such as the scheduling entity 102. The subordinate entity 104 may be a referred to as a schedulee, and/or any other suitable term without deviating from the scope of the present disclosure. The subordinate entity 104 may be, or may reside within, a UE, a cellular phone, a smart phone, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, a mesh node, a peer, a session initiation protocol phone, a laptop, a notebook, a netbook, a smartbook, a personal digital assistant, a satellite radio, a global positioning system device, a multimedia device, a video device, a digital audio player, a camera, a game console, an entertainment device, a vehicle component, a wearable computing device (e.g., a smart watch, glasses, a health or fitness tracker, etc.), an appliance, a sensor, a vending machine, and/or any other suitable device.

As used herein, 'control channel(s)' may sometimes be used to communicate grant information. The scheduling entity 102 may transmit DL data channel(s) 106 and DL control channel(s) 108. The subordinate entity 104 may transmit UL data channel(s) 110 and UL control channel(s) 112. The channels illustrated in FIG. 1 are not necessarily all of the channels that may be utilized by the scheduling entity 102 and/or the subordinate entity 104. Those of ordinary skill in the art will recognize that other channels may be utilized in addition to those illustrated, such as other data, control, and feedback channels. As used herein, the term 'downlink' or 'DL' may refer to a point-to-multipoint transmission originating at the scheduling entity 102, and the term 'uplink' or 'UL' may refer to a point-to-point transmission originating at the subordinate entity 104. According to aspects of the present disclosure, the term(s) 'communicate' and/or 'communicating' refer to transmission and/or reception. One of ordinary skill in the art will understand that many types of technologies may perform such communication without deviating from the scope of the present disclosure. As used herein, the term 'DL-centric time-division duplex (TDD) subframe' refers to a TDD subframe in which a substantial proportion (e.g., majority) of the information is communicated in the DL direction, even though some of the information may be communicated in the UL direction. Also, the term 'UL-centric TDD subframe' refers to a TDD subframe in which a substantial proportion (e.g., majority) of the information is communicated in the UL direction, even though some information may be communicated in the DL direction.

Figure 2:
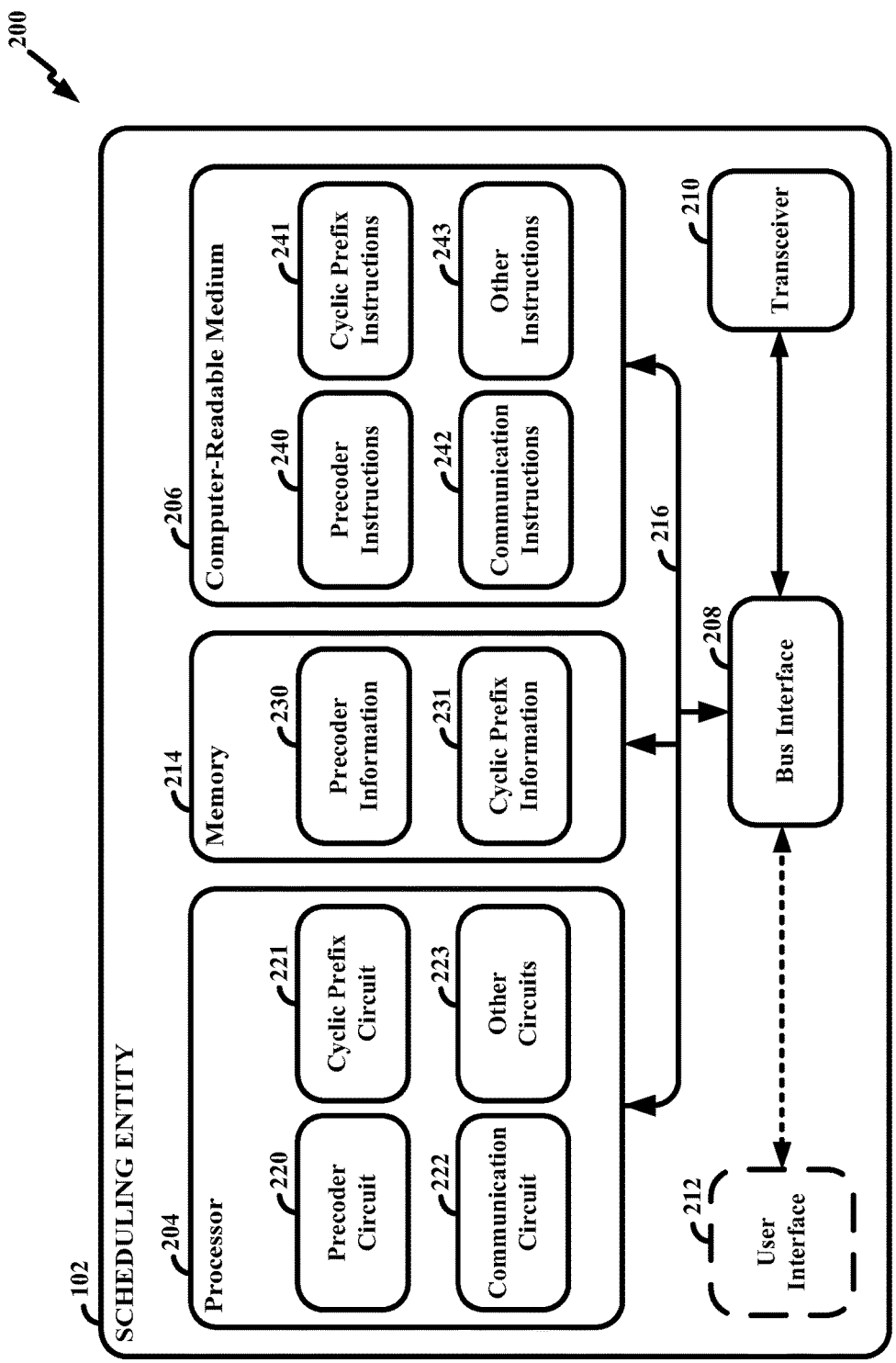
FIG. 2 illustrates a diagram showing an example of a hardware implementation of a scheduling entity according to aspects of the present disclosure.

FIG. 2 is a diagram 200 illustrating an example of a hardware implementation of the scheduling entity 102 according to various aspects of the present disclosure. The scheduling entity 102 may include a user interface 212. The user interface 212 may be configured to receive one or more inputs from a user of the scheduling entity 102. In some configurations, the user interface 212 may be a keypad, a display, a speaker, a microphone, a joystick, and/or any other suitable component of the scheduling entity 102. The user interface 212 may exchange data via the bus interface 208. The scheduling entity 102 may also include a transceiver 210. The transceiver 210 may be configured to receive data and/or transmit data in communication with another apparatus. The transceiver 210 provides a means for communicating with another apparatus via a wired or wireless transmission medium. The transceiver 210 may be configured to perform such communications using various types of technologies without deviating from the scope of the present disclosure.

The scheduling entity 102 may also include a memory 214, one or more processors 204, a computer-readable medium 206, and a bus interface 208. The bus interface 208 may provide an interface between a bus 216 and the transceiver 210. The memory 214, the one or more processors 204, the computer-readable medium 206, and the bus interface 208 may be connected together via the bus 216. The processor 204 may be communicatively coupled to the transceiver 210 and/or the memory 214.

The processor 204 may include a precoder circuit 220. The precoder circuit 220 may include hardware components and/or may perform various algorithms that provide the means for selecting a precoder mode for a transmission. The processor 204 may also include a cyclic prefix (CP) circuit 221. The CP circuit 221 may include hardware components and/or may perform various algorithms that provide the means for changing a CP length based on the selected precoder mode. The processor 204 may also include a communication circuit 222. The communication circuit 222 may include hardware components and/or may perform various algorithms that provide the means for transmitting a signal that includes the changed CP length.

In some configurations, the CP circuit 221 may also include hardware components and/or may perform various algorithms that provide the means for using the selected precoder mode to lookup a value by which to change a nominal CP length. In some configurations, the communication circuit 222 may also include hardware components and/or may perform various algorithms that provide the means for transmitting information indicating the changed CP length to a receiver of the signal after changing the CP length. In some configurations, the communication circuit 222 may also include hardware components and/or may perform various algorithms that provide the means for transmitting information indicating the selected precoder mode to a receiver of the signal after selecting the precoder mode.

The means for selecting the precoder mode may be configured according to any one or more of various aspects described in greater detail herein. In some configurations, the means for selecting the precoder mode may be configured for receiving feedback information from a receiver of the signal, wherein the feedback information indicates whether the receiver requests a change to the CP length, and selecting the precoder mode based on the feedback information. In some configurations, the means for selecting the precoder mode may be configured for receiving a reference signal indicating a condition of a communication channel, and selecting a precoder mode that results in a smallest relative delay spread based on the received reference signal. In some configurations, the means for selecting the precoder mode may be configured for receiving a reference signal indicating a condition of a communication channel, and selecting a precoder mode that results in a largest relative delay spread compression based on the received reference signal. In some configurations, the means for selecting the precoder mode may be configured for receiving a reference signal indicating a condition of a communication channel, and selecting a precoder mode that results in a largest relative beamforming gain based on the received reference signal. In some configurations, the means for selecting the precoder mode may be configured for receiving a reference signal indicating a condition of a communication channel, and selecting a precoder mode that results in a largest relative throughout based on the received reference signal.

The foregoing description provides a non-limiting example of the processor 204 of the scheduling entity 102. Although various circuits 220, 221, 222 are described above, one of ordinary skill in the art will understand that the processor 204 may also include various other circuits 223 that are in addition and/or alternative(s) to the aforementioned circuits 220, 221, 222. Such other circuits 223 may provide the means for performing any one or more of the functions, methods, processes, features and/or aspects described herein.

The computer-readable medium 206 may include various computer-executable instructions. The computer-executable instructions may include computer-executable code configured to perform various functions and/or enable various aspects described herein. The computer-executable instructions may be executed by various hardware components (e.g., the processor 204 and/or any of its circuits 220, 221, 222, 223) of the scheduling entity 102. The computer-executable instructions may be a part of various software programs and/or software modules.

The computer-readable medium 206 may include precoder instructions 240. The precoder instructions 240 may include computer-executable instructions configured for selecting a precoder mode for a transmission. The computer-readable medium 206 may also include CP instructions 241. The CP instructions 240 may include computer-executable instructions configured for changing a CP length based on the selected precoder mode. The computer-readable medium 206 may also include communication instructions 242. The communication instructions 242 may include computer-executable instructions configured for transmitting a signal that includes the changed CP length.

In some configurations, the CP instructions 241 may also include computer-executable instructions configured for using the selected precoder mode to lookup a value by which to change a nominal CP length. In some configurations, the communication instructions 242 may also include computer-executable instructions configured for transmitting information indicating the changed CP length to a receiver of the signal after changing the CP length. In some configurations, the communication instructions 242 may also include computer-executable instructions configured for transmitting information indicating the selected precoder mode to a receiver of the signal after selecting the precoder mode.

The precoder instructions 240 may include computer-executable instructions configured according to any one or more of various aspects described in greater detail herein. In some configurations, the precoder instructions 240 may be configured for selecting the precoder mode may be configured for receiving feedback information from a receiver of the signal, wherein the feedback information indicates whether the receiver requests a change to the CP length, and selecting the precoder mode based on the feedback information. In some configurations, the precoder instructions 240 may be configured for receiving a reference signal indicating a condition of a communication channel, and selecting a precoder mode that results in a smallest relative delay spread based on the received reference signal. In some configurations, the precoder instructions 240 may be configured for receiving a reference signal indicating a condition of a communication channel, and selecting a precoder mode that results in a largest relative delay spread compression based on the received reference signal. In some configurations, the precoder instructions 240 may be configured for receiving a reference signal indicating a condition of a communication channel, and selecting a precoder mode that results in a largest relative beamforming gain based on the received reference signal. In some configurations, the precoder instructions 240 may be configured for receiving a reference signal indicating a condition of a communication channel, and selecting a precoder mode that results in a largest relative throughout based on the received reference signal.

The foregoing description provides a non-limiting example of the computer-readable medium 206 of the scheduling entity 102. Although various computer-executable instructions 240, 241, 242 are described above, one of ordinary skill in the art will understand that the computer-readable medium 206 may also include various other computer-executable instructions 243 that are in addition and/or alternative(s) to the aforementioned computer-executable instructions 240, 241, 242. Such other computer-executable instructions 243 may be configured for any one or more of the functions, methods, processes, features and/or aspects described herein.

The memory 214 may include various memory modules. The memory modules may be configured to store, and have read therefrom, various values and/or information by the processor 204, or any of its circuits 220, 221, 222, 223. The memory modules may also be configured to store, and have read therefrom, various values and/or information upon execution of the computer-executable code included in the computer-readable medium 206, or any of its instructions 240, 241, 242, 243. The memory 214 may include precoder information 230. The precoder information 230 may include various types, quantities, configurations, arrangements, and/or forms of information related to a precoder or precoder mode according to one or more of the various aspects described in greater detail herein. The memory 214 may also include CP information 231. The CP information 231 may include various types, quantities, configurations, arrangements, and/or forms of information related to a CP as described in greater detail herein. Although various types of data of the memory 214 are described above, one of ordinary skill in the art will understand that the memory 214 may also include various other data that are in addition and/or alternative(s) to the aforementioned information 230, 231. Such other data may be associated with any one or more of the functions, methods, processes, features and/or aspects described herein.

One of ordinary skill in the art will also understand that the scheduling entity 102 may include alternative and/or additional features without deviating from the scope of the present disclosure. In accordance with various aspects of the present disclosure, an element, or any portion of an element, or any combination of elements may be implemented with a processing system that includes one or more processors 204. Examples of the one or more processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. The processing system may be implemented with a bus architecture, represented generally by the bus 216 and bus interface 208. The bus 216 may include any number of interconnecting buses and bridges depending on the specific application of the processing system and the overall design constraints. The bus 216 may link together various circuits including the one or more processors 204, the memory 214, and the computer-readable medium 206. The bus 216 may also link various other circuits such as timing sources, peripherals, voltage regulators, and power management circuits.

The one or more processors 204 may be responsible for managing the bus 216 and general processing, including the execution of software stored on the computer-readable medium 206. The software, when executed by the one or more processors 204, causes the processing system to perform the various functions described below for any one or more apparatuses. The computer-readable medium 206 may also be used for storing data that is manipulated by the one or more processors 204 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 206.

The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 206 may also include, by way of example, a carrier wave, a transmission line, and any other suitable medium for transmitting software and/or instructions that may be accessed and read by a computer. The computer-readable medium 206 may reside in the processing system, external to the processing system, or distributed across multiple entities including the processing system. The computer-readable medium 206 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 3:
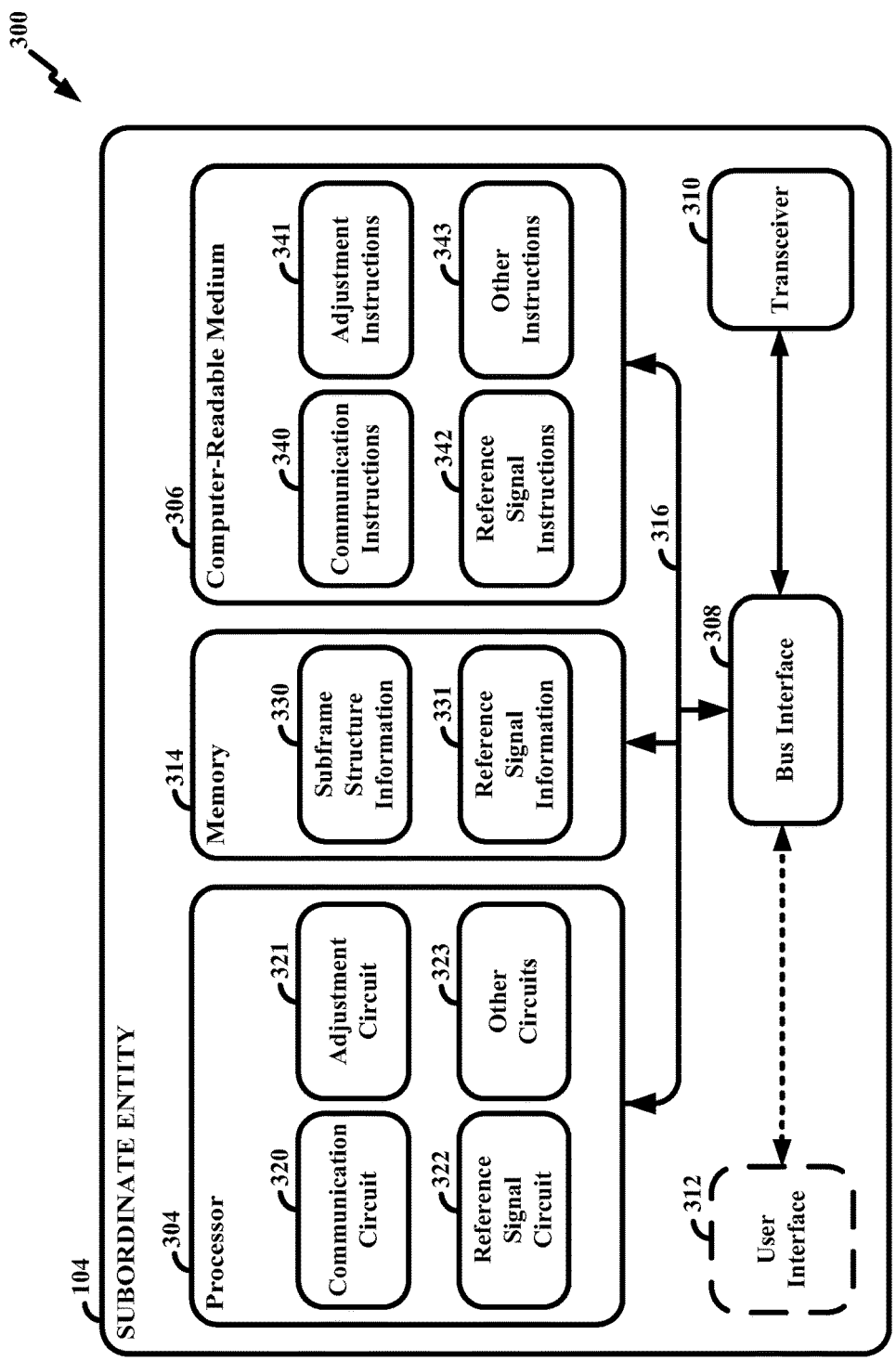
FIG. 3 illustrates a diagram showing an example of a hardware implementation of the subordinate entity according to aspects of the present disclosure.

FIG. 3 is a diagram 300 illustrating an example of a hardware implementation of the subordinate entity 104 according to various aspects of the present disclosure. The subordinate entity 104 may include a user interface 312. The user interface 312 may be configured to receive one or more inputs from a user of the subordinate entity 104. In some configurations, the user interface 312 may be a keypad, a display, a speaker, a microphone, a joystick, and/or any other suitable component of the subordinate entity 104. The user interface 312 may exchange data via the bus interface 308. The subordinate entity 104 may also include a transceiver 310. The transceiver 310 may be configured to receive data and/or transmit data in communication with another apparatus. The transceiver 310 provides a means for communicating with another apparatus via a wired or wireless transmission medium. The transceiver 310 may be configured to perform such communications using various types of technologies without deviating from the scope of the present disclosure.

The subordinate entity 104 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The subordinate entity 104 may also include a memory 314, one or more processors 304, a computer-readable medium 306, and a bus interface 308. The bus interface 308 may provide an interface between a bus 316 and the transceiver 310. The memory 314, the one or more processors 304, the computer-readable medium 306, and the bus interface 308 may be connected together via the bus 316. The processor 304 may be communicatively coupled to the transceiver 310 and/or the memory 314.

The processor 304 may include a precoder circuit 320. The precoder circuit 320 may include hardware components and/or may perform various algorithms that provide the means for selecting a precoder mode for a transmission. The processor 304 may also include a CP circuit 321. The CP circuit 321 may include hardware components and/or may perform various algorithms that provide the means for changing a CP length based on the selected precoder mode. The processor 304 may also include a communication circuit 322. The communication circuit 322 may include hardware components and/or may perform various algorithms that provide the means for transmitting a signal that includes the changed CP length.

In some configurations, the CP circuit 321 may also include hardware components and/or may perform various algorithms that provide the means for using the selected precoder mode to lookup a value by which to change a nominal CP length. In some configurations, the communication circuit 322 may also include hardware components and/or may perform various algorithms that provide the means for transmitting information indicating the changed CP length to a receiver of the signal after changing the CP length. In some configurations, the communication circuit 322 may also include hardware components and/or may perform various algorithms that provide the means for transmitting information indicating the selected precoder mode to a receiver of the signal after selecting the precoder mode.

The means for selecting the precoder mode may be configured according to any one or more of various aspects described in greater detail herein. In some configurations, the means for selecting the precoder mode may be configured for receiving feedback information from a receiver of the signal, wherein the feedback information indicates whether the receiver requests a change to the CP length, and selecting the precoder mode based on the feedback information. In some configurations, the means for selecting the precoder mode may be configured for receiving a reference signal indicating a condition of a communication channel, and selecting a precoder mode that results in a smallest relative delay spread based on the received reference signal. In some configurations, the means for selecting the precoder mode may be configured for receiving a reference signal indicating a condition of a communication channel, and selecting a precoder mode that results in a largest relative delay spread compression based on the received reference signal. In some configurations, the means for selecting the precoder mode may be configured for receiving a reference signal indicating a condition of a communication channel, and selecting a precoder mode that results in a largest relative beamforming gain based on the received reference signal. In some configurations, the means for selecting the precoder mode may be configured for receiving a reference signal indicating a condition of a communication channel, and selecting a precoder mode that results in a largest relative throughout based on the received reference signal.

The foregoing description provides a non-limiting example of the processor 304 of the subordinate entity 104. Although various circuits 320, 321, 322 are described above, one of ordinary skill in the art will understand that the processor 304 may also include various other circuits 323 that are in addition and/or alternative(s) to the aforementioned circuits 320, 321, 322. Such other circuits 323 may provide the means for performing any one or more of the functions, methods, processes, features and/or aspects described herein.

The computer-readable medium 306 may include precoder instructions 340. The precoder instructions 340 may include computer-executable instructions configured for selecting a precoder mode for a transmission. The computer-readable medium 306 may also include CP instructions 341. The CP instructions 340 may include computer-executable instructions configured for changing a CP length based on the selected precoder mode. The computer-readable medium 306 may also include communication instructions 342. The communication instructions 342 may include computer-executable instructions configured for transmitting a signal that includes the changed CP length.

In some configurations, the CP instructions 341 may also include computer-executable instructions configured for using the selected precoder mode to lookup a value by which to change a nominal CP length. In some configurations, the communication instructions 342 may also include computer-executable instructions configured for transmitting information indicating the changed CP length to a receiver of the signal after changing the CP length. In some configurations, the communication instructions 342 may also include computer-executable instructions configured for transmitting information indicating the selected precoder mode to a receiver of the signal after selecting the precoder mode.

The precoder instructions 340 may include computer-executable instructions configured according to any one or more of various aspects described in greater detail herein. In some configurations, the precoder instructions 340 may be configured for selecting the precoder mode may be configured for receiving feedback information from a receiver of the signal, wherein the feedback information indicates whether the receiver requests a change to the CP length, and selecting the precoder mode based on the feedback information. In some configurations, the precoder instructions 340 may be configured for receiving a reference signal indicating a condition of a communication channel, and selecting a precoder mode that results in a smallest relative delay spread based on the received reference signal. In some configurations, the precoder instructions 340 may be configured for receiving a reference signal indicating a condition of a communication channel, and selecting a precoder mode that results in a largest relative delay spread compression based on the received reference signal. In some configurations, the precoder instructions 340 may be configured for receiving a reference signal indicating a condition of a communication channel, and selecting a precoder mode that results in a largest relative beamforming gain based on the received reference signal. In some configurations, the precoder instructions 340 may be configured for receiving a reference signal indicating a condition of a communication channel, and selecting a precoder mode that results in a largest relative throughout based on the received reference signal.

The foregoing description provides a non-limiting example of the computer-readable medium 306 of the subordinate entity 104. Although various computer-executable instructions 340, 341, 342 are described above, one of ordinary skill in the art will understand that the computer-readable medium 306 may also include various other computer-executable instructions 343 that are in addition and/or alternative(s) to the aforementioned computer-executable instructions 340, 341, 342. Such other computer-executable instructions 343 may be configured for any one or more of the functions, methods, processes, features and/or aspects described herein.

The memory 314 may include various memory modules. The memory modules may be configured to store, and have read therefrom, various values and/or information by the processor 304, or any of its circuits 320, 321, 322, 323. The memory modules may also be configured to store, and have read therefrom, various values and/or information upon execution of the computer-executable code included in the computer-readable medium 306, or any of its instructions 340, 341, 342, 343. The memory 314 may include precoder information 330. The precoder information 330 may include various types, quantities, configurations, arrangements, and/or forms of information related to a precoder or precoder mode according to one or more of the various aspects described in greater detail herein. The memory 314 may also include CP information 331. The CP information 331 may include various types, quantities, configurations, arrangements, and/or forms of information related to a CP as described in greater detail herein. Although various types of data of the memory 314 are described above, one of ordinary skill in the art will understand that the memory 314 may also include various other data that are in addition and/or alternative(s) to the aforementioned information 330, 331. Such other data may be associated with any one or more of the functions, methods, processes, features and/or aspects described herein.

One of ordinary skill in the art will also understand that the subordinate entity 104 may include alternative and/or additional features without deviating from the scope of the present disclosure. In accordance with various aspects of the present disclosure, an element, or any portion of an element, or any combination of elements may be implemented with a processing system that includes one or more processors 304. Examples of the one or more processors 304 include microprocessors, microcontrollers, DSPs, FPGAs, PLDs, state machines, gated logic, discrete hardware circuits, and other suitable hardware configured to perform the various functionality described throughout this disclosure. The processing system may be implemented with a bus architecture, represented generally by the bus 316 and bus interface 308. The bus 316 may include any number of interconnecting buses and bridges depending on the specific application of the processing system and the overall design constraints. The bus 316 may link together various circuits including the one or more processors 304, the memory 314, and the computer-readable medium 306. The bus 316 may also link various other circuits such as timing sources, peripherals, voltage regulators, and power management circuits.

The one or more processors 304 may be responsible for managing the bus 316 and general processing, including the execution of software stored on the computer-readable medium 306. The software, when executed by the one or more processors 304, causes the processing system to perform the various functions described below for any one or more apparatuses. The computer-readable medium 306 may also be used for storing data that is manipulated by the one or more processors 304 when executing software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on the computer-readable medium 306.

The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a CD or a DVD), a smart card, a flash memory device (e.g., a card, a stick, or a key drive), a RAM, a ROM, a PROM, an EPROM, an EEPROM, a register, a removable disk, and any other suitable medium for storing software and/or instructions that may be accessed and read by a computer. The computer-readable medium 306 may also include, by way of example, a carrier wave, a transmission line, and any other suitable medium for transmitting software and/or instructions that may be accessed and read by a computer. The computer-readable medium 306 may reside in the processing system, external to the processing system, or distributed across multiple entities including the processing system. The computer-readable medium 306 may be embodied in a computer program product. By way of example and not limitation, a computer program product may include a computer-readable medium in packaging materials. Those skilled in the art will recognize how best to implement the described functionality presented throughout this disclosure depending on the particular application and the overall design constraints imposed on the overall system.

Figure 4:
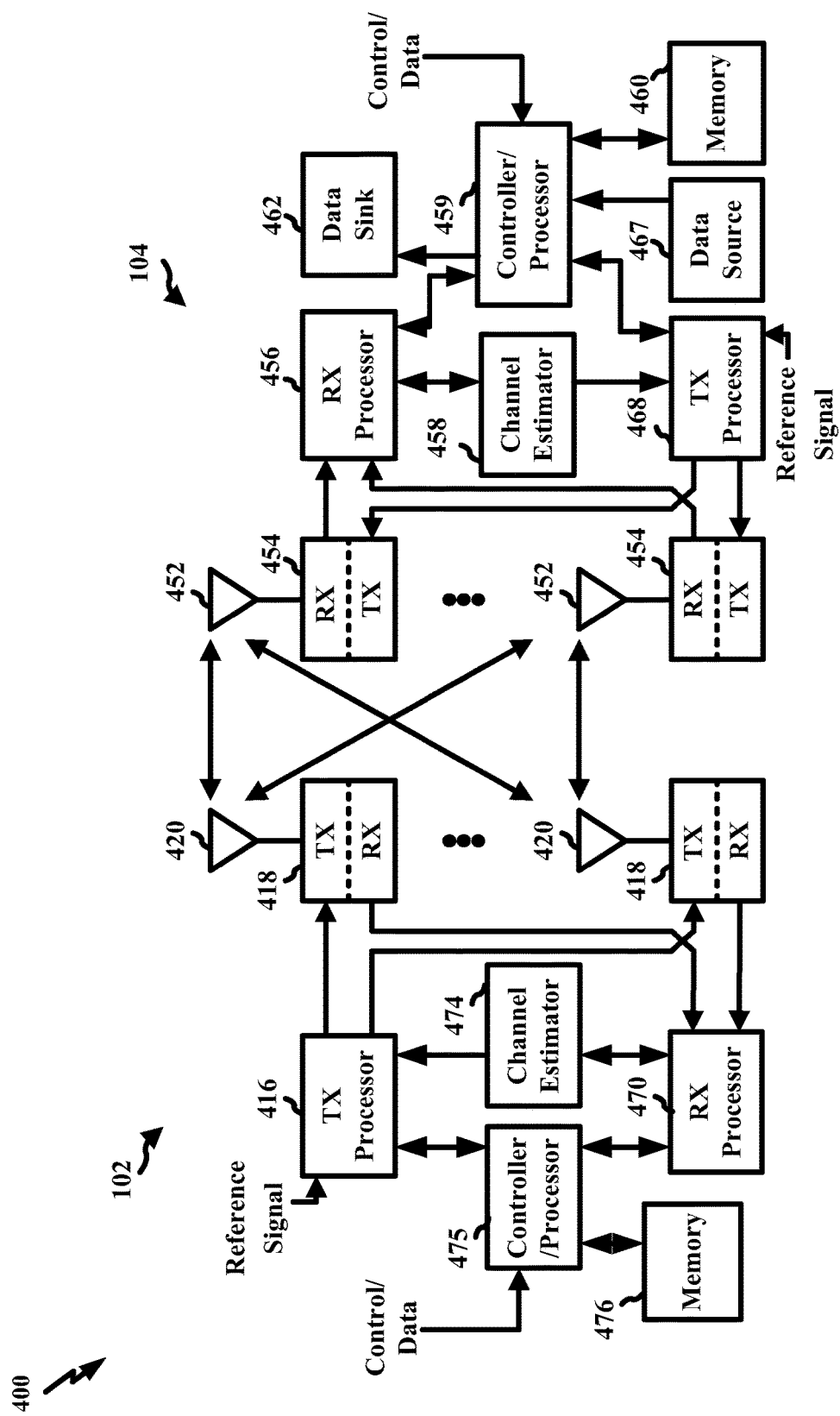
FIG. 4 illustrates a diagram showing an example of a scheduling entity in communication with a subordinate entity in an access network according to aspects of the present disclosure.

FIG. 4 illustrates a diagram 400 showing the scheduling entity 102 in communication with the subordinate entity 104 in an access network according to aspects of the present disclosure. In the DL, upper layer packets from the core network are provided to a controller/processor 475. The controller/processor 475 implements the functionality of the L2 layer. In the DL, the controller/processor 475 provides header compression, ciphering, packet segmentation and reordering, multiplexing between logical and transport channels, and radio resource allocations to the subordinate entity 104 based on various priority metrics. The controller/processor 475 is also responsible for HARQ operations, retransmission of lost packets, and signaling to the subordinate entity 104.

The transmit (TX) processor 416 implements various signal processing functions for the L1 layer (i.e., physical layer). The signal processing functions include coding and interleaving to facilitate forward error correction (FEC) at the subordinate entity 104 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the subordinate entity 104. Each spatial stream may then be provided to a different antenna 420 via a separate transmitter 418TX. Each transmitter 418TX may modulate an RF carrier with a respective spatial stream for transmission.

Each receiver 418RX may be configured to receive wireless signals of various types, schemes, configurations, and/or modulations. The RX processor 470 may be configured to receive, decode, demodulate, and/or otherwise process any UL signal that is received by the receiver 418RX. In some examples, the UL signal is adapted for orthogonal frequency-division multiple access (OFDMA), which is a multi-user version of the modulation scheme referred to as orthogonal frequency-division multiplexing (OFDM). In some examples, the UL signal is adapted for single-carrier frequency-division multiple access (SC-FDMA). Such signals may even co-exist in some examples. In other words, the RX processor 470 and the receiver 418RX may perform UL communication using waveforms that may co-exist in OFDMA and SC-FDMA.

At the subordinate entity 104, each receiver 454RX receives a signal through its respective antenna 452. Each receiver 454RX recovers information modulated onto an RF carrier and provides the information to the receive (RX) processor 456. The RX processor 456 implements various signal processing functions of the L1 layer. The RX processor 456 may perform spatial processing on the information to recover any spatial streams destined for the subordinate entity 104. If multiple spatial streams are destined for the subordinate entity 104, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the scheduling entity 102. These soft decisions may be based on channel estimates computed by the channel estimator 458. The soft decisions are then decoded and deinterleaved to recover the data and control signals that were originally transmitted by the scheduling entity 102 on the physical channel. The data and control signals are then provided to the controller/processor 459.

The controller/processor 459 implements the L2 layer. The controller/processor can be associated with a memory 460 that stores program codes and data. The memory 460 may be referred to as a computer-readable medium. In the UL, the controller/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing. The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer. Similar to the functionality described in connection with the DL transmission by the scheduling entity 102, the controller/processor 459 implements the L2 layer for the user plane and the control plane by providing header compression, ciphering, packet segmentation and reordering, and multiplexing between logical and transport channels based on radio resource allocations by the scheduling entity 102. The controller/processor 459 is also responsible for HARQ operations, retransmission of lost packets, and signaling to the scheduling entity 102.

Channel estimates derived by a channel estimator 458 from a reference signal or feedback transmitted by the scheduling entity 102 may be used by the TX processor 468 to select the appropriate coding and modulation schemes, and to facilitate spatial processing. The spatial streams generated by the TX processor 468 may be provided to different antenna 452 via separate transmitters 454TX. Each transmitter 454TX may modulate an RF carrier with a respective spatial stream for transmission.

Each transmitter 454TX may be configured to transmit wireless signals of various types, schemes, configurations, and/or modulations. The TX processor 468 may be configured to generate, encode, modulate, and/or otherwise produce any UL signal that is transmitted by the transmitter 454TX. In some examples, the UL signal is adapted for OFDMA. In some examples, the UL signal is adapted for SC-FDMA. Such signals may even co-exist in some examples. In other words, the TX processor 468 and the transmitter 454TX may perform UL communication using waveforms that co-exist in OFDMA and SC-FDMA.

The UL transmission is processed at the scheduling entity 102 in a manner similar to that described in connection with the receiver function at the subordinate entity 104. Each receiver 418RX receives a signal through its respective antenna 420. Each receiver 418RX recovers information modulated onto an RF carrier and provides the information to a RX processor 470. The RX processor 470 may implement the L1 layer.

The controller/processor 475 implements the L2 layer. The controller/processor 475 can be associated with a memory 476 that stores program codes and data. The memory 476 may be referred to as a computer-readable medium. In the UL, the control/processor 475 provides demultiplexing between transport and logical channels, packet reassembly, deciphering, header decompression, control signal processing to recover upper layer packets from the subordinate entity 104. Upper layer packets from the controller/processor 475 may be provided to the core network. The controller/processor 475 is also responsible for error detection using an ACK and/or NACK protocol to support HARQ operations.

Figure 5:
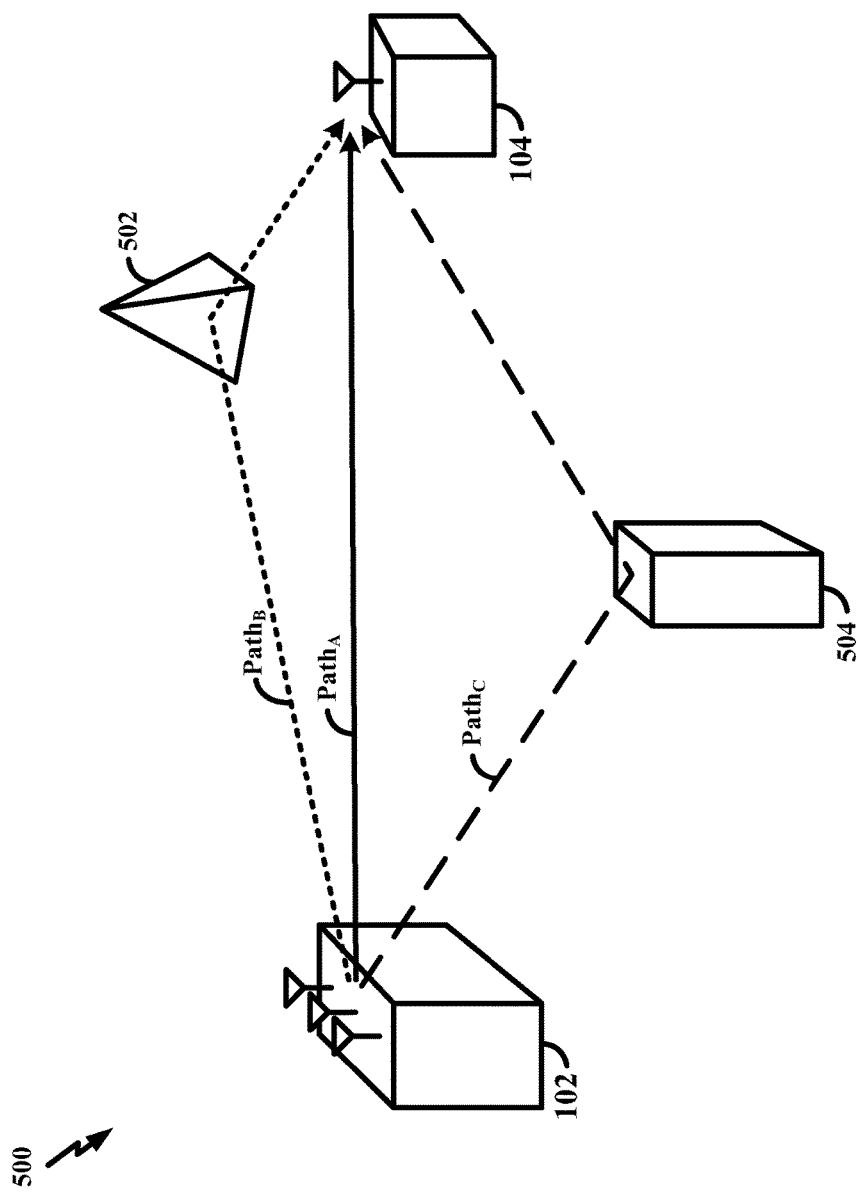
FIG. 5 illustrates a diagram showing an example of multipath communication according to aspects of the present disclosure.

FIG. 5 illustrates a diagram 500 showing an example of multipath communication according to aspects of the present disclosure. This example illustrates how a signal may take multiple paths as it propagates from the scheduling entity 102 to the subordinate entity 104. For example, Path$_A$ represents a direct path from the scheduling entity 102 to the subordinate entity 104. The transmitted signal may also travel from the scheduling entity 102 to the subordinate entity 104 via indirect paths. Some paths may reflect off of various obstacles 502, 504 before reaching the subordinate entity 104. As an example, Path$_B$ represents a path in which the signal reflects off of an obstacle 502 that redirects the signal to the subordinate entity 104. As another example, Path$_C$ represents a path in which the signal reflects off of another obstacle 504 that redirects the signal to the subordinate entity 104. In the example illustrated in FIG. 5, Path$_C$ is longer than Path$_B$. Accordingly, the signal propagating in Path$_B$ will arrive at the subordinate entity 104 prior to the signal propagating in Path$_C$. The signal propagating in Path$_A$ will arrive prior to both signals propagating in Path$_B$ and Path$_C$.

Figure 6:
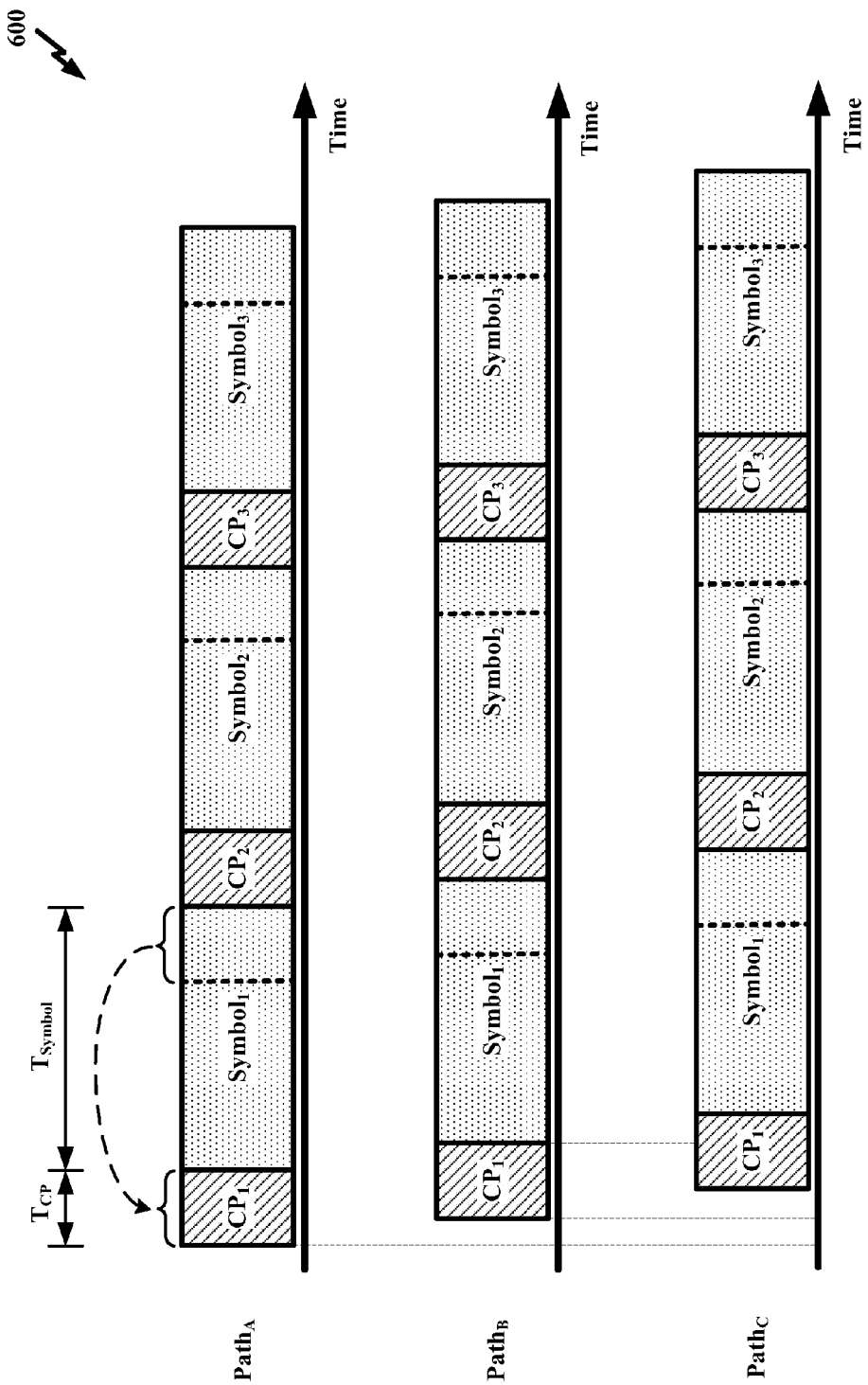
FIG. 6 illustrates a diagram showing an example of timelines corresponding to the multipath communication according to aspects of the present disclosure.

FIG. 6 illustrates a diagram 600 showing an example of timelines corresponding to the multipath communication according to aspects of the present disclosure. FIG. 6 illustrates that the signal propagating in Path$_A$ arrives earlier in time relative to the signal propagating in Path$_B$. FIG. 6 also illustrates that the signal propagating in Path$_B$ arrives earlier in time relative to the signal propagating in Path$_C$. The signals illustrated in FIG. 6 show that each symbol may have a CP. Generally, a CP refers to a repeated portion of the symbol that precedes that symbol. In other words, a symbol is preceded by a CP, and that CP repeats a portion (e.g., an end portion) of that symbol. For example, as illustrated in FIG. 6, CP$_1$ repeats the end portion of Symbol$_1$. Typically, the CP is discarded by the receiver (e.g., subordinate entity 104); however, the CP has various purposes. One of many purposes of the CP is to function as a guard interval for mitigating inter-symbol interference. For example, CP$_2$ may mitigate interference between Symbol$_1$ and Symbol$_2$.

The CP may have various lengths without deviating from the scope of the present disclosure. In some existing systems, the CP length may utilize 5%-10% of the resources of the physical channel. One of ordinary skill in the art will understand that any reference herein to 'length' may also refer to related concepts such as duration, time, period, bits, and other suitable concepts without deviating from the scope of the present disclosure. As such, any reference herein to 'CP length' may also refer to CP overhead, CP duration, CP time, CP period, CP bits, and other suitable CP-related aspects without deviating from the scope of the present disclosure.

Generally, without any precoding, as the number of paths taken by the signal increases, the appropriate length for the CP also increases. One reason for this general relationship is that more time is needed for the energy from echoes (e.g., signals propagating in Path$_B$ and Path$_C$) of a particular symbol (e.g., Symbol$_1$) to dissipate prior to receiving another symbol (e.g., Symbol$_2$). Otherwise, the echoes from a preceding symbol (e.g., Symbol$_1$) may interfere with a current symbol (e.g., Symbol$_2$). Accordingly, in some circumstances, a relatively longer CP length may be appropriate as the number of paths increases.

However, a CP length that is needlessly too long may adversely affect system performance (e.g., reduced throughput). As mentioned above, the CP is typically discarded at the receiver (e.g., subordinate entity 104). Nevertheless, the CP utilizes communication resources that may otherwise be utilized to carry information that will not be discarded at the receiver (e.g., subordinate entity 104). Accordingly, although the CP is utilized in many implementations of wireless communication, the appropriate length for the CP may differ under varying circumstances.

FIG. 7 illustrates diagrams 700, 750 showing examples of times at which signals arrive at the subordinate entity 104. One of ordinary skill in the art will understand that the example provided in FIG. 7 shows general temporal relationships and is not scaled to depict exact time increments. A first diagram 700 illustrates an example of times at which signals from Path$_A$, Path$_B$, and Path$_C$ arrive at the subordinate entity 104 when the scheduling entity 102 does not implement enhanced precoding for the transmission.

Generally, precoding may be utilized by multi-antenna devices for wireless communication. Precoding may involve multiple data streams being emitted from transmit antennas with independent and appropriate weights such that the link throughout is maximized at the receiver (e.g., subordinate entity 104). Put in another way, precoding exploits transmit diversity by weighing information streams, sometimes using information or knowledge about the wireless communication channel. Precoding may support beamforming. Generally, beamforming refers to a spatial filtering technique used for directional signal transmission. In other words, the transmitter (e.g., scheduling entity 102) may apply various weights to various antennas of the transmitter (e.g., scheduling entity 102) to minimize multipath, thereby minimizing the duration of time over which echoes are detected at the receiver (e.g., subordinate entity 104), which may consequently reduce the CP length appropriate for that transmission. Because wireless communication devices may have many antennas that can be utilized for the wireless communication, enhanced precoding techniques may provide substantial reductions in multipath and, consequently, minimize the CP length needed for particular transmissions. In some configurations, precoding and/or beamforming may be applied on a per-tone basis. In other words, per-tone beamforming/precoding may even further compress the delay spread (e.g., in massive multiple-input multiple output (MIMO) communication systems). For example, the CP length may be reduced by approximately 50%, or possibly even more.

While the first diagram 700 illustrates an example of times at which signals arrive at the subordinate entity 104 when enhanced precoding techniques are not utilized by the scheduling entity 102, the second diagram 750 illustrates an example of times at which signals arrive at the subordinate entity 104 when enhanced precoding techniques are utilized by the scheduling entity 102. A comparison of the two diagrams 700, 750 reveals that enhanced precoding techniques may reduce the amount of time over which signal echoes are received at the subordinate entity 104. For example, instead of arriving near times T$_2$ and T$_3$, the signals in Path$_B$ and Path$_C$ arrive near time T$_1$ when enhanced precoding techniques are utilized by the scheduling entity 102. In other words, the precoding applied to the transmit signal results in a collapse of many of the multipath echoes into essentially a single energy peak.

Figure 8:
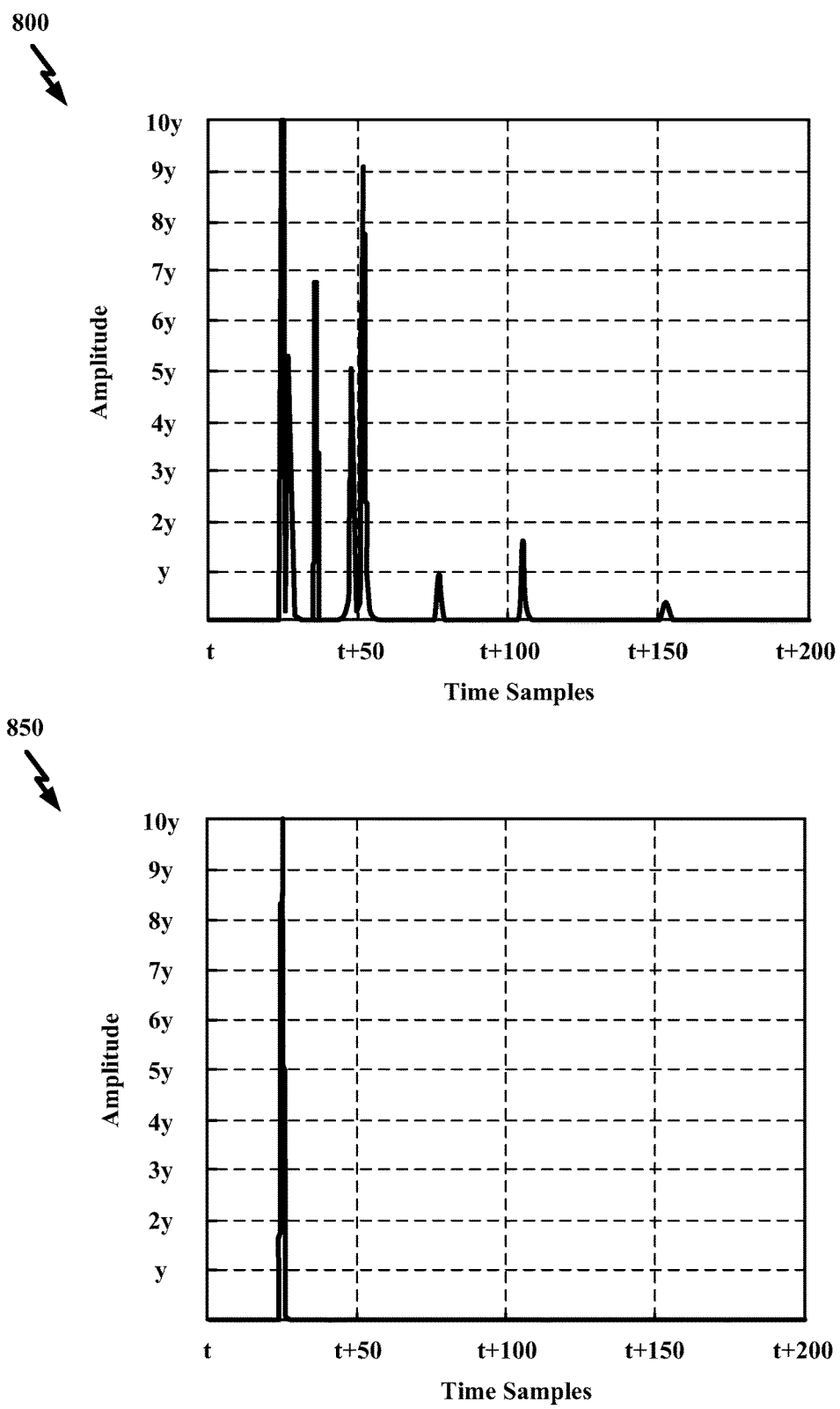
FIG. 8 illustrates diagrams showing additional examples of times at which signals arrive at the subordinate entity according to aspects of the present disclosure.

FIG. 8 illustrates diagrams 800, 850 showing additional examples of times at which signals arrive at the subordinate entity 104. A first diagram 800 illustrates an example of times at which signals arrive at the subordinate entity 104 when enhanced precoding techniques are not utilized by the scheduling entity 102. In comparison, the second diagram 850 illustrates an example of times at which signals arrive at the subordinate entity 104 when enhanced precoding techniques are utilized by the scheduling entity 102. A comparison of the two diagrams 800, 850 reveals that enhanced precoding techniques may reduce the duration of time over which signal echoes are received at the subordinate entity 104. For example, instead of being detected in the time period of t+50 through t+150, energy from the echoes of the transmitted signal are detected, if at all, in the time period preceding t+50 when enhanced precoding techniques are utilized by the scheduling entity 102.

In some aspects, the diagrams 800, 850 may sometimes be referred to as power delay profiles (PDPs), each of which may include a plot of the power of the channel impulse response. A channel (e.g., a wideband channel) may have a number (e.g., L number) of (non-zero) multipath components, which may sometimes be referred to as 'taps' or 'chips.' For example, in the first FIG. 800 of FIG. 8, nine (9) multipath components (e.g., taps or chips) are illustrated, each having a different amplitude. These multipath components may correspond to different paths that the signal traveled or propagated from $N_T$ transmit antenna(s) (e.g., at the scheduling entity 102) to $N_R$ receive antenna(s) (e.g., at the subordinate entity 104).

In mathematical terms, each of these multipath components (e.g., taps or chips) may be referred to as: $h_{l1}$, $h_{l2}$, ..., $h_{lL}$, where $h_i$ refers to a vector with $N_T$ complex numbers that correspond to the multipath components (e.g., taps or chips) from each transmit antenna to each receive antenna at the $i^{th}$ multipath component (e.g., tap or chip), and where the indices of the locations of the multipath components (e.g., taps or chips) may be expressed as $\pounds=\{l_1, l_2, l_3, ..., l_L\}$. The frequency domain representation of the channel may be represented as $H_K=\Sigma_{l\in\pounds} h_l e^{-j2\pi kl/N}$. In some aspects, $H_K$ represents a vector with $N_T$ complex numbers that correspond to the channel estimate of the $k^{th}$ subcarrier for each transmit-receive (TX-RX) antenna pair. A subset of $\pounds$ may be referred to as C. That is, C may refer to a subset of indices of multipath components of interest. In some circumstances, the selection of C may affect the precoder design. For instance, C may be selected such that one or more performance metrics are optimized or maximized. The present disclosure describes many non-limiting examples of performance metrics, such as relative delay spread, relative delay spread compression, relative beamforming gain, relative throughput, and many others.

Using C, the frequency domain representation of the channel may be expressed as: $\tilde{H}_K=\Sigma_{l\in C} h_l e^{-j2\pi kl/N}$, which may sometimes be referred to as a 'sparse' representation of $H_K$. According to some aspects of the present disclosure, a transmitter (e.g., scheduling entity 102) may design a precoder per subcarrier k according to the following expression:

$$P_K = \frac{1}{\sqrt{P}} \tilde{H}_k^*,$$

where P refers to the total power (which may be normalized to meet some transmit power constraints), and where * refers to the conjugate-transpose operation of $\tilde{H}_K$. After applying such a precoder, the channel per subcarrier may be expressed as: $G_k=H_k P_k$. In some aspects, $G_k$ may represent the effective channel that the receiver (e.g., subordinate entity 104) may observe after the transmitter (e.g., scheduling entity 102) has applied the precoder at each subcarrier. In the time domain, such a channel may be represented as:

$$g_l = \frac{1}{\sqrt{P}} \sum_{m \in C} h(\mathrm{mod}(l+m, N)) h(m)^*,$$

where N refers to the discrete Fourier transform (DFT) size, and where "mod" refers to the modulo operation. The PDP after applying such a precoder may be defined by $|g_l|^2$, which may also be referred to as the effective channel after precoding.

Figure 9:
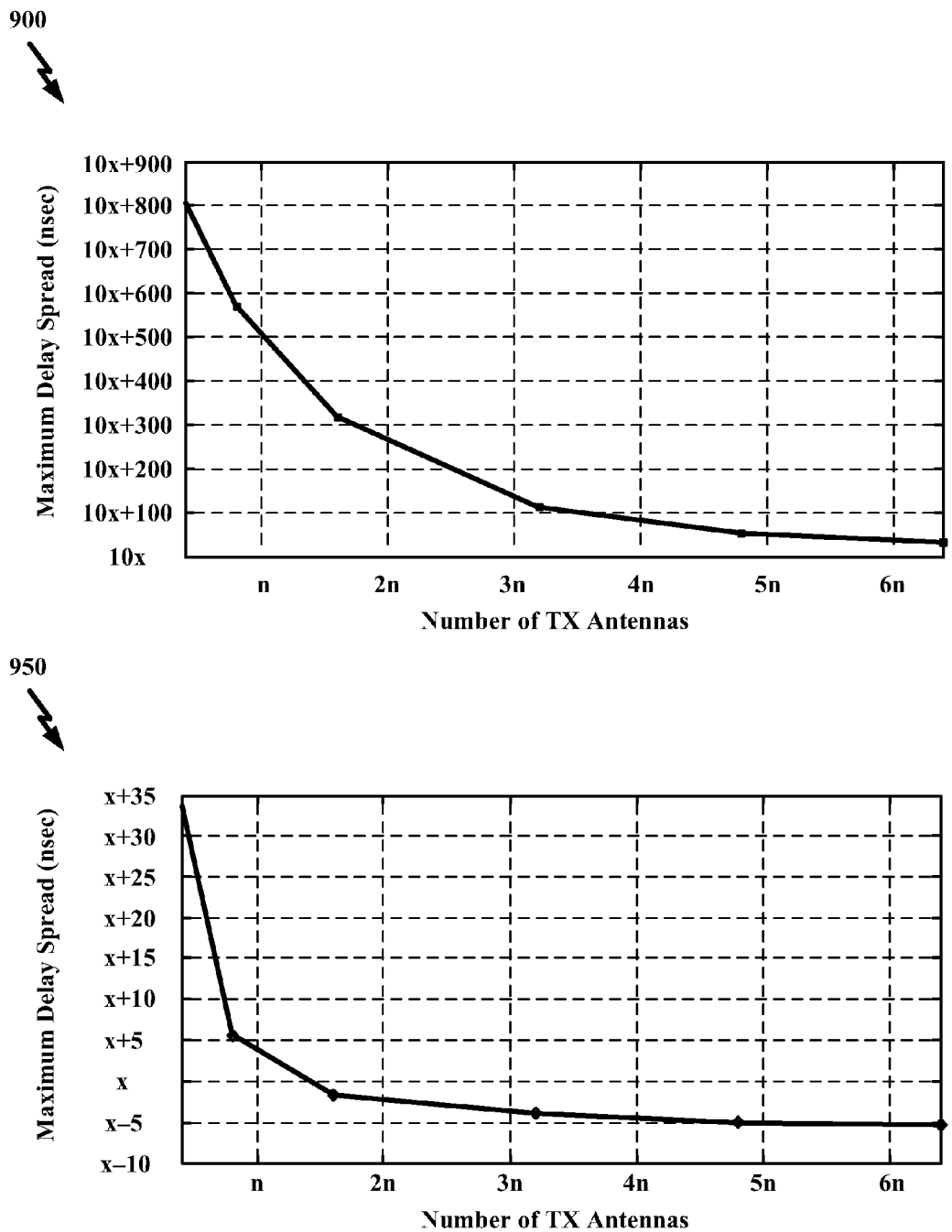
FIG. 9 illustrates diagrams showing examples of maximum delay spread for various signals transmitted by the scheduling entity according to aspects of the present disclosure.

FIG. 9 illustrates diagrams 900, 950 showing examples of maximum delay spread for various signals transmitted by the scheduling entity 102. As used herein, 'delay spread' is a measure related to the multipath of a communication channel. The delay spread may be interpreted as the difference between the arrival time of the earliest significant multipath signal (e.g., the signal propagating in $Path_A$) and the arrival time of the latest significant multipath signal (e.g., the signal propagating in $Path_C$). The delay spread may be used in the characterization of wireless communication channels.

As used herein, a reduction in delay spread may sometimes be referred to as 'delay spread compression' without deviating from the scope of the present disclosure. Such reductions of delay spread (e.g., delay spread compression) may be realized because the precoding applied to the transmit signal results in a collapse of many of the multipath echoes into essentially a single energy peak.

As used herein, 'maximum delay spread' refers to the duration of time or number of time samples needed for a received symbol's energy to fall a certain amount (e.g., 20 decibels (dB)) below the average power of the symbol. Put another way, maximum delay spread may refer to a measure of how much time is needed for the power (after the end of the symbol) to be a certain amount (e.g., −20 dB) lower than the average energy of the symbol.

A first diagram 900 illustrates an example of various maximum delay spreads when enhanced precoding techniques are not utilized by the scheduling entity 102. In comparison, the second diagram 950 illustrates an example of various maximum delay spreads when enhanced precoding techniques are utilized by the scheduling entity 102. A comparison of the two diagrams 900, 950 reveals that enhanced precoding techniques may reduce maximum delay spreads. For example, n number of TX antennas may have a maximum delay spread of 10x+500 nanoseconds (where x represents any positive value) when enhanced precoding techniques are not utilized by the scheduling entity 102, whereas n number of TX antennas may have a maximum delay spread of x+4 nanoseconds when enhanced precoding techniques are utilized by the scheduling entity 102.

Figure 10:
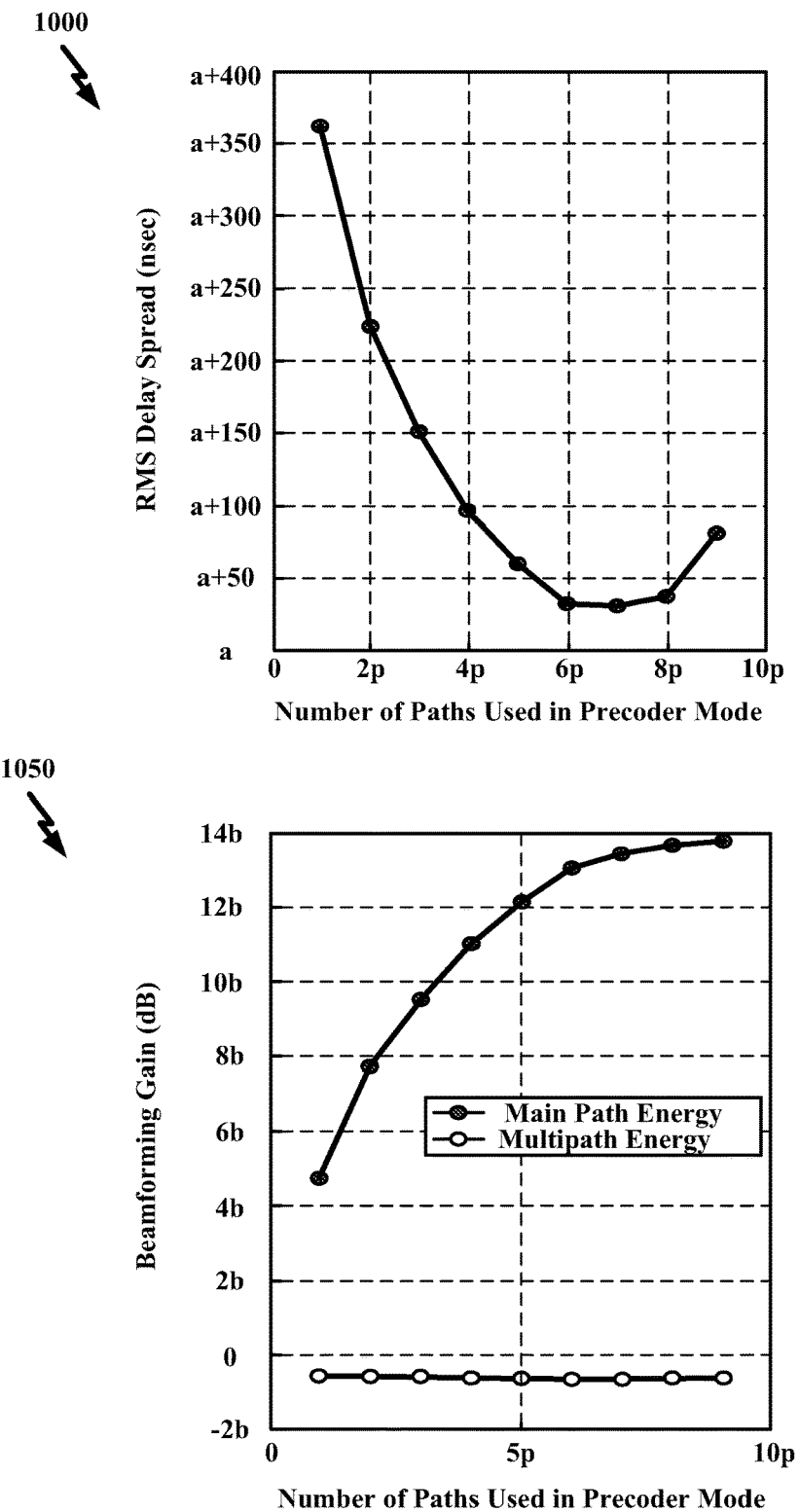
FIG. 10 illustrates diagrams showing aspects associated with varying the number of paths used in a precoder mode according to aspects of the present disclosure.

FIG. 10 illustrates diagrams 1000, 1050 showing aspects associated with varying the number of paths used in a precoder mode. Generally, the number of paths used in the precoder mode refers to the number of paths that the precoder mode takes into account when weighing the various signals transmitted by its antennas. A first diagram 1000 illustrates how the number of paths used in the precoder mode may affect the root-mean-square (RMS) delay spread. Generally, the RMS delay spread corresponds to the standard deviation of the delays of the signal echoes (e.g., reflections). For instance, the RMS delay spread may indicate the variability of the arrival times of the signal echoes (e.g., reflections). A receiver may align reception of its signal(s)/symbol(s) with the average delay spread of the multipath transmission. However, the receiver may also consider the variability (e.g., deviations) of the delay spreads. In other words, the same average delay spread may have different RMS delay spread values, depending on the delay variability of the signal echoes (e.g., reflections). Accordingly, in some circumstances, the RMS delay spread may be a factor used in CP length selection. For instance, the receiver may select a CP length that accommodates for a certain percentage or proportion of the delays in the signal echoes (e.g., reflections). In the first diagram 1000 illustrated in FIG. 10, RMS delay spread is measured in units of nanoseconds.

In part, the first diagram 1000 illustrates that the RMS delay spread decreases as the number of paths used in the precoder mode increases. For example, when the number of paths used in the precoder mode increases from 1p to 6p (wherein p represents any positive integer), the RMS delay spread decreases from approximately a+360 to approximately a+40 (wherein a represents any positive value). However, in another part, the first diagram 1000 illustrates that the RMS delay spread may remain relatively constant or even increase as the number of paths used in the precoder mode increases. For example, when the number of paths used in the precoder mode increases from 6p to 9p, the RMS delay spread remains relatively constant (at approximately a+40) and thereafter increases (from approximately a+40 to approximately a+80).

In FIG. 10, a second diagram 1050 illustrates how the number of paths used in the precoder mode may affect beamforming gain. In this example, beamforming gain is measured in units of decibels. Generally, beamforming gain refers to the energy gain or power gain achieved as a result of precoding the transmit signal prior to wireless transmission. Firstly, this diagram 1050 illustrates that the main path energy increases substantially as the number of paths include in the precoder mode is increased. Secondly, this diagram 1050 illustrates that the multipath energy remains relatively constant, even as the number of paths used in the precoder mode varies.

Figure 11:
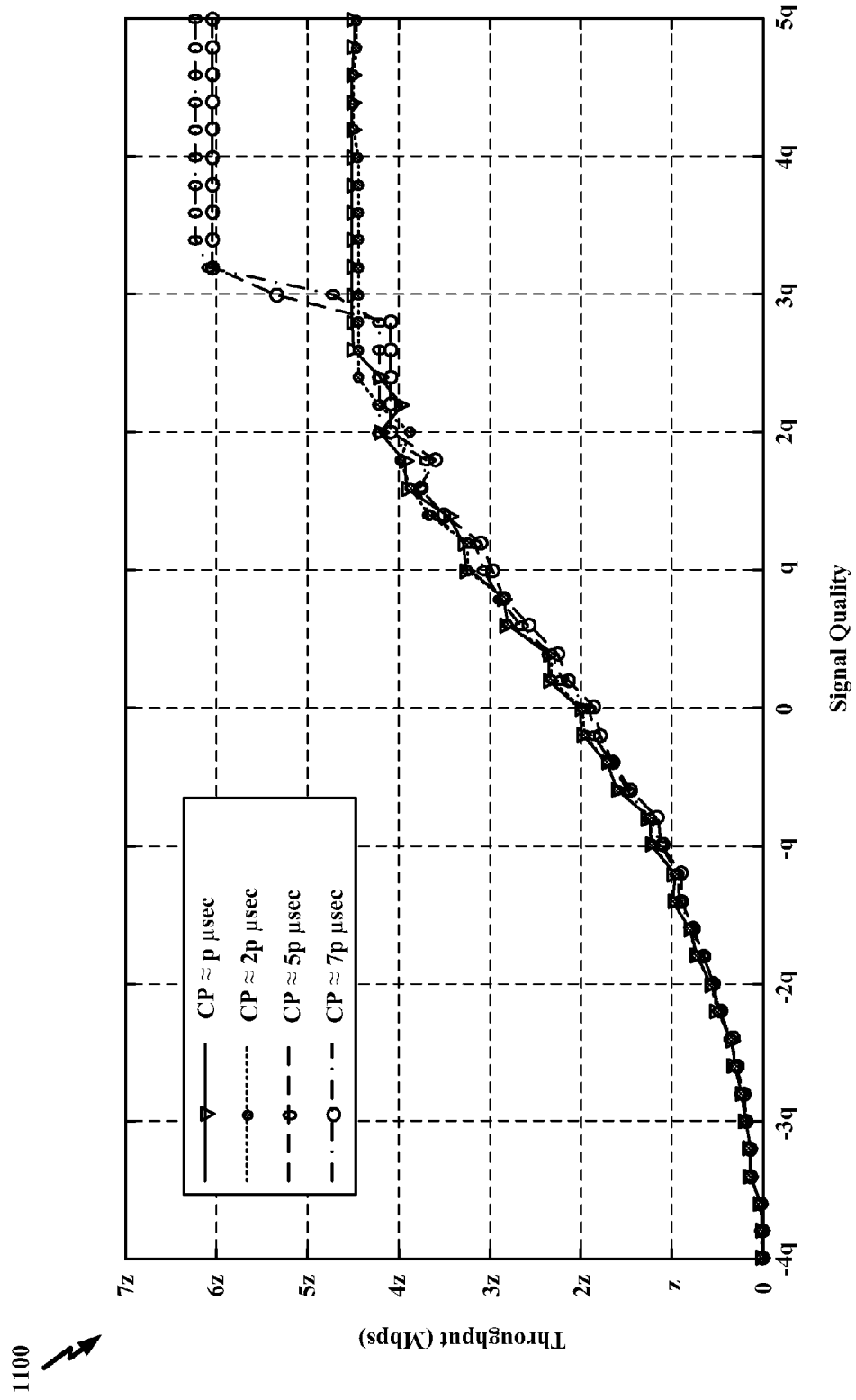
FIG. 11 illustrates a diagram showing an example of a relationship between signal quality and throughput according to aspects of the present disclosure.

FIG. 11 illustrates a diagram 1100 showing an example of a relationship between signal quality and throughput when a precoder mode that could lead to a significant delay spread reduction is used. This relationship is shown for various CP lengths for a channel that would typically need a CP length of 7p in order to reach the peak throughput of the system. In this example, throughput is measured in megabits per second (Mbps), and CP length is measured in microseconds. The 'signal quality' shown in FIG. 11 and described herein may refer to a carrier to interference-plus-noise ratio (CINR), signal-to-noise ratio (SNR), and/or various other suitable measures of signal quality. Firstly, this diagram 1100 shows that a reduction in CP length may sometimes result in a reduction in throughput when the signal quality is relatively high. When the signal quality is relatively high (e.g., 3q through 5q), a reduction in the CP length from 5p to 2p results in a substantial reduction in throughput (e.g., a reduction from 6z to 4.5z), wherein p and z may each represent any positive value. Secondly, this diagram 1000 shows that a reduction in CP length does not always result in a reduction in throughput, and, in some scenarios, results in an increase in the peak throughput. This may happen because a shorter CP length may still be enough to handle the compressed delay spread. As may be revealed from a comparison of peak throughput for CP lengths of 5p and 7p in the diagram 100 of FIG. 11, a relatively higher peak throughput may be achieved, which may be because the CP length is relatively shorter, thereby enabling relatively more data information to be transmitted. One of ordinary skill in the art will note that, when the signal quality is relatively high (e.g., 3q through 5q), neither a reduction in the CP length from 2p to p nor a reduction in the CP length from 7p to 5p results in a substantial reduction in throughput, which may be due to the compressed delay spread that results by using a specific precoder mode.

Figure 12:
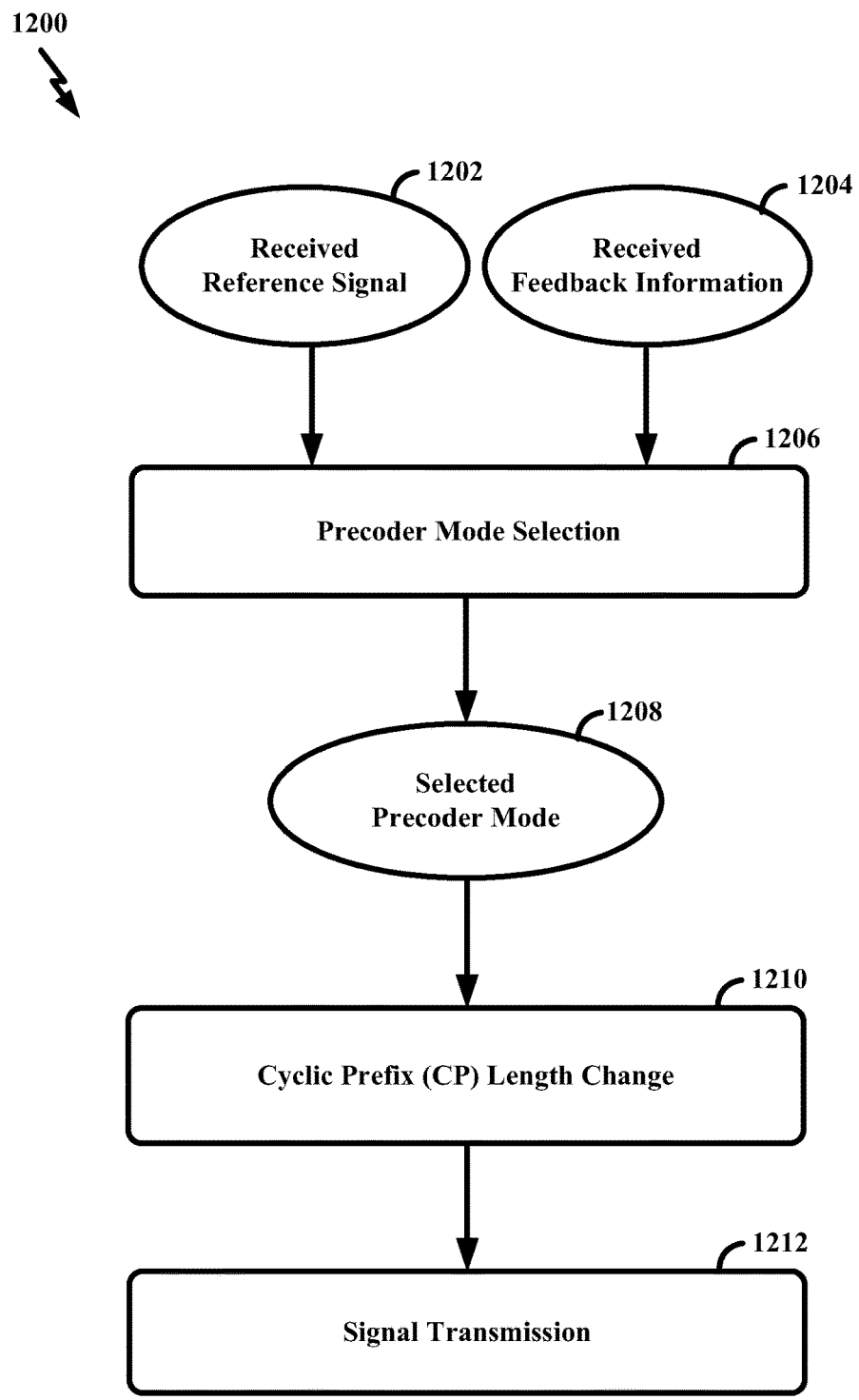
FIG. 12 illustrates a diagram showing an example implementation according to aspects of the present disclosure.

FIG. 12 illustrates a diagram 1200 showing an example implementation according to aspects of the present disclosure. Block 1206 conceptually represents precoder mode selection. Generally, precoder mode selection refers to the selection of a precoder mode for various types of wireless communication. As used herein, a 'precoder mode' may refer to and/or include a precoder type, a precoder configuration, a precoder scheme, a precoder setting, a precoder parameter, a precoder weight, and/or any other suitable aspect associated with a precoder mode without deviating from the scope of the present disclosure. In some configurations, the precoder mode may correspond to a particular transmission mode (TM). For example, an apparatus may infer the precoder mode based on the TM. Precoder mode selection may be based on many types of information without deviating from the scope of the present disclosure.

A non-limiting example of such information (on which precoder mode selection is based) is a received reference signal, which is represented by block 1202. For example, a subordinate entity 104 may transmit a reference signal (e.g., a sounding signal) to the scheduling entity 102. The reference signal may include various types of information, such as a condition or a state of the wireless communication channel (e.g., without any precoding). Based on that received reference signal, the scheduling entity 102 may select an appropriate precoder mode. The particular precoder mode selected by the scheduling entity may differ in varying configurations. In some configurations, the scheduling entity 102 may select the precoder mode that results in a smallest relative delay spread. In some configurations, the scheduling entity 102 may select the precoder mode that results in a largest relative delay spread compression. Aspects pertaining to delay spread and delay spread compression are described in greater detail with reference to FIGS. 9 and 10 and therefore will not be repeated. In some configurations, the scheduling entity 102 may select the precoder mode that results in a largest relative beamforming gain. Aspects pertaining to beamforming gain are described in greater detail with reference to FIG. 10 and therefore will not be repeated. In some configurations, the scheduling entity 102 may select the precoder mode that results in a largest relative throughput. Aspects pertaining to throughput are described in greater detail with reference to FIG. 11 and therefore will not be repeated.

Another non-limiting example of such information (on which precoder mode selection is based) is received feedback information, which is represented by block 1204. For example, the scheduling entity 102 may transmit a signal to the subordinate entity 104, and the subordinate entity 104 may report feedback information back to the scheduling entity 102. The feedback information may pertain to the CP length, the delay spread, the throughput, and/or various other suitable aspects without deviating from the scope of the present disclosure. In some examples, the feedback information may indicate whether the subordinate entity 104 requests a change to the CP length. The feedback information may also be in various forms and/or configurations without deviating from the scope of the present disclosure. In some examples, the feedback information may be in the form of a single bit (e.g., a happy bit), which may indicate whether the subordinate entity 104 requests a change to the CP length. In some examples, the feedback information may also include an additional bit. In the event that the subordinate entity 104 does request a change to the CP length, this additional bit may indicate whether that change is an increase in the CP length or a decrease in the CP length. Based on such feedback information, the scheduling entity 102 may select a particular precoder mode.

Block 1208 conceptually represents the selected precoder mode. Block 1210 conceptually represents CP length change. According to various aspects of the present disclosure, the change in CP length is based on the selected precoder mode. In many existing systems, the CP length is not based on the selected precoder mode. In some existing system (e.g., some telecommunication systems), the CP length may be fixed or predetermined. In some other existing systems (e.g., some wireless local access networks), the CP length may sometimes vary based on information about the wireless communication channel, but not the selected precoder mode. In other words, existing systems may change the CP length in the same way even when the selected precoder mode varies. Put another way, in existing systems, selecting a particular precoder mode does not necessarily affect how the CP length is changed. However, changing the CP length based on the precoder mode selection has many advantages over existing systems. For example, because the selected precoder mode may be able to estimate the delay spread (or delay spread compression) of the wireless transmission, the transmitter may be aware of the appropriate CP length for that particular wireless transmission. The appropriate CP length may long enough to minimize inter-symbol interference (as described in greater detail above, e.g., with reference to FIG. 6) but not so long that the CP length adversely impacts throughput (as described in greater detail above, e.g., with reference to FIGS. 6 and 11). Accordingly, enabling the scheduling entity 102 to change the CP length based on the precoder mode selection may increase efficiency of the wireless communication.

The mechanism and/or technique by which the scheduling entity 102 implements the change of the CP length based on the selected precoder mode may vary based on specific design constraints of the specific wireless communication device, network, and/or technology. Although some examples of such mechanisms and/or techniques may be described herein, one of ordinary skill in the art will understand that various other alternatives are also within the scope of the present disclosure. In some examples, the scheduling entity 102 may change the CP length by using the selected precoder mode to lookup a value by which to change a nominal CP length. For instance, a lookup table may store such a value. The value may be a fixed quantity (e.g., any real number), a multiplier (e.g., 2×), a fraction (e.g., ½), and/or any other suitable parameter by which a nominal (e.g., default, predetermined, preset, previous, etc.) CP length can be changed. Such values may be updated from time to time based on various system parameters, network conditions, and other suitable triggers. Each of these values may be mapped to a particular precoder mode. Based on the selected precoder mode, the corresponding CP length may be retrieved and used to change the CP length.

After the CP length change, a signal may be transmitted. Block 1212 conceptually represents signal transmission. The transmitted signal may be precoded using the selected precoder mode, as described above with reference to blocks 1206, 1208. The transmitted signal may also include the changed CP length, as described above with reference to block 1210.

Figure 13:
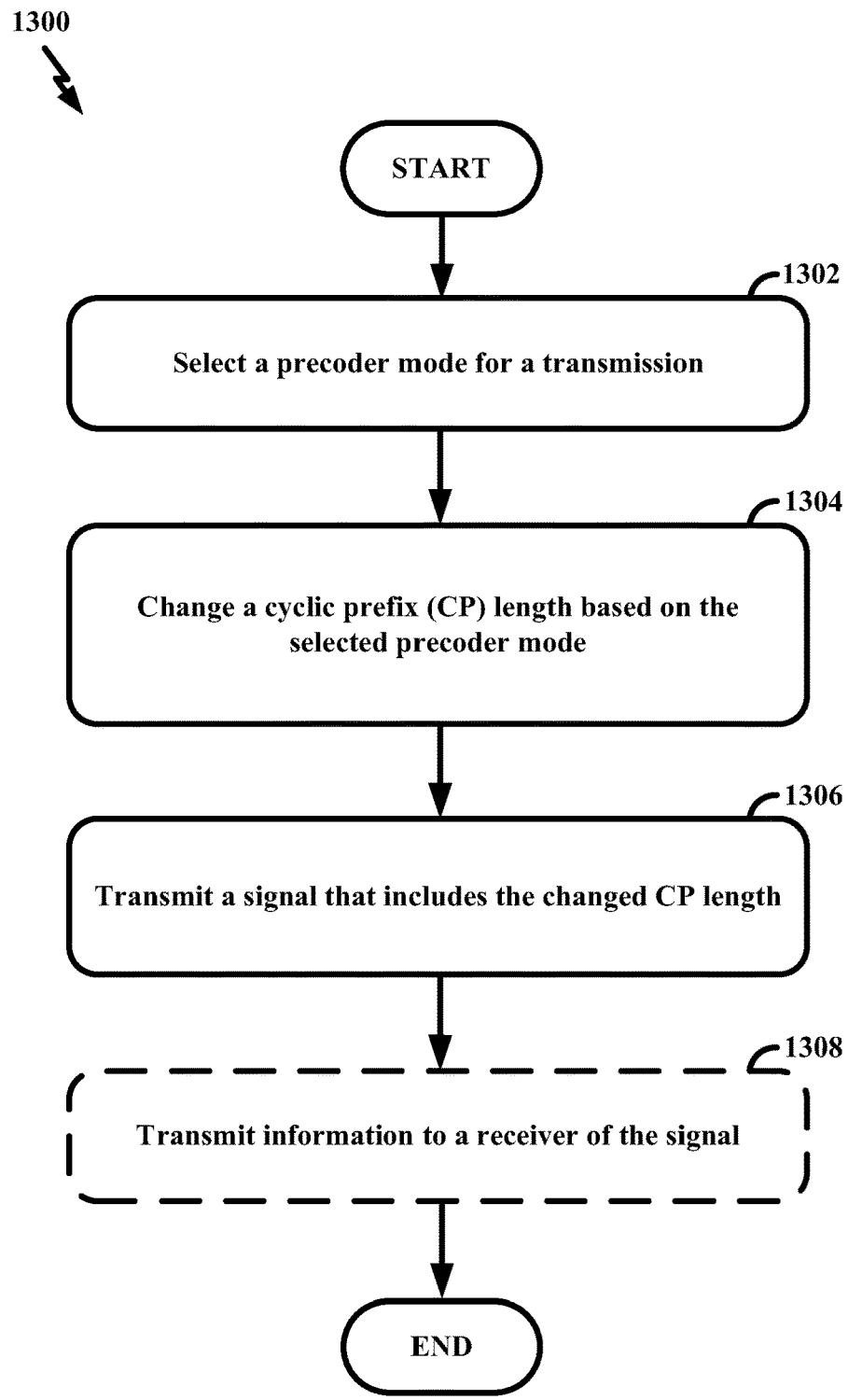
FIG. 13 illustrates a diagram showing various methods and/or processes performed by the scheduling entity according to aspects of the present disclosure.

FIG. 13 illustrates a diagram 1300 showing various methods and/or processes performed by the scheduling entity 102. One of ordinary skill in the art will understand that such methods and/or processes may be performed by various any other suitable apparatus without deviating from the scope of the present disclosure. At block 1302, the scheduling entity 102 may select a precoder mode for a transmission. In some examples, the scheduling entity 102 may select the precoder mode based on feedback information received from the subordinate entity 104. The feedback information may indicate whether the subordinate entity 104 requests a change to the CP length. In some examples, the scheduling entity 102 may select the precoder mode based on a reference signal received from the subordinate entity 104. Based on the reference signal, the scheduling entity 102 may select the precoder mode that results in the smallest relative delay spread, a largest relative delay spread compression, a largest beamforming gain, and/or a largest relative throughput.

At block 1304, the scheduling entity 102 may change a CP length based on the selected precoder mode. In some examples, the scheduling entity 102 may change the CP length by using the selected precoder mode to lookup a value by which to change a nominal CP length. Various other techniques and/or mechanisms for changing the CP length based on the selected precoder mode are within the scope of the present disclosure. At block 1306, the scheduling entity 102 may transmit a signal that includes the changed CP length. In some examples, the signal may be precoded using the selected precoder mode. Additional description pertaining to precoding and CP length is provided herein, e.g., with reference to FIG. 6, and therefore will not be repeated. In some configurations, at block 1308, the scheduling entity 102 may transmit certain information to a receiver (e.g., subordinate entity 104) of the signal. In some examples, such information may indicate the changed CP length. In some examples, such information may indicate the selected precoder mode. By providing any of these kinds of information, the receiver (e.g., subordinate entity 104) may be prepared for receiving the precoded signal that includes the changed CP length. For example, the receiver will have information about the portion of the received signal that corresponds to the CP length.

The methods and/or processes described with reference to FIG. 13 are provided for illustrative purposes and are not intended to limit the scope of the present disclosure. The methods and/or processes described with reference to FIG. 13 may be performed in sequences different from those illustrated therein without deviating from the scope of the present disclosure. Additionally, some or all of the methods and/or processes described with reference to FIG. 13 may be performed individually and/or together without deviating from the scope of the present disclosure. It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The description herein is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The invention claimed is:

1. A method of wireless communication, the method comprising:
   transmitting a first signal having a first cyclic prefix (CP) length over a communication channel, wherein the first CP length is based on a first precoder mode;
   receiving a reference signal indicating a condition of the communication channel;
   selecting a second precoder mode for transmission of a second signal, wherein the selection is based on the received reference signal, and wherein the second precoder mode results in a compressed delay spread relative to another delay spread of the first precoder mode;
   changing the first CP length to a second CP length, the second CP length based on the selected second precoder mode; and
   transmitting the second signal having the second CP length over the communication channel.

2. The method of claim 1, wherein changing the first CP length comprises:
   using the selected second precoder mode to lookup a value indicative of the second CP length by which to change the first CP length.

3. The method of claim 1, further comprising:
   after changing the first CP length, transmitting information indicating the change to a receiver of the first signal.

4. The method of claim 1, further comprising:
   after selecting the second precoder mode, transmitting information indicating the selected second precoder mode to a receiver of the signal.

5. The method of claim 1, wherein selecting the second precoder mode comprises:
   receiving feedback information from a receiver of the signal, wherein the feedback information indicates whether the receiver requests the change from the first CP length to the second CP length; and
   selecting the second precoder mode based on the feedback information.

6. The method of claim 1, wherein selecting the second precoder mode comprises:
   receiving a reference signal indicating a condition of a communication channel; and
   based on the received reference signal, selecting the second precoder mode, wherein the second precoder mode results in a beamforming gain.

7. The method of claim 1, wherein selecting the precoder mode comprises:
   receiving a reference signal indicating a condition of a communication channel; and
   based on the received reference signal, selecting the second precoder mode, wherein the second precoder mode results in a maximized throughout over the communication channel.

8. The method of claim 1, wherein the second signal is precoded using the second precoder mode.

9. The method of claim 1, further comprising determining a delay spread based on one or more parameters indicating a condition of a communication channel, wherein selection of the second precoder mode is based on the delay spread.

10. An apparatus configured for wireless communication, the apparatus comprising:
    a transceiver;
    a memory; and
    at least one processor communicatively coupled to the transceiver and the memory, wherein the at least one processor is configured to:
      transmit a first signal having a first cyclic prefix (CP) length over a communication channel, wherein the first CP length is based on a first precoder mode,
      receive a reference signal indicating a condition of the communication channel,
      select a second precoder mode for transmission of a second signal, wherein the selection is based on the received reference signal, and wherein the second precoder mode results in a compressed delay spread relative to another delay spread of the first precoder mode,
      change the first CP length to a second CP length, the second CP length based on the selected second precoder mode, and
      transmit the second signal having the second CP length over the communication channel.

11. The apparatus of claim 10, wherein change of the CP length comprises:
    using the selected second precoder mode to lookup a value indicative of the second CP length by which to change the first CP length.

12. The apparatus of claim 10, wherein the at least one processor is further configured to:
    after the change of the first CP length, transmit information indicating the change to a receiver of the first signal.

13. The apparatus of claim 10, wherein the at least one processor is further configured to:
    after the selection of the second precoder mode, transmit information indicating the selected second precoder mode to a receiver of the signal.

14. The apparatus of claim 10, wherein selection of the second precoder mode comprises:
    receiving feedback information from a receiver of the signal, wherein the feedback information indicates whether the receiver requests the change from the first CP length to the second CP length; and
    selecting the second precoder mode based on the feedback information.

15. The apparatus of claim 10, wherein selection of the second precoder mode comprises:
    receiving a reference signal indicating a condition of a communication channel; and
    based on the received reference signal, selecting the second precoder mode, wherein the second precoder mode results in a beamforming gain.

16. The apparatus of claim 10, wherein selection of the precoder mode comprises:
    receiving a reference signal indicating a condition of a communication channel; and
    based on the received reference signal, selecting the second precoder mode, wherein the second precoder mode results in a maximized throughout over the communication channel.

17. The apparatus of claim 10, wherein the second signal is precoded using the second precoder mode.

18. An apparatus for wireless communication, the apparatus comprising:

means for transmitting a first signal having a first cyclic prefix (CP) length over a communication channel, wherein the first CP length is based on a first precoder mode;

means for receiving a reference signal indicating a condition of the communication channel;

means for selecting a second precoder mode for transmission of a second signal, wherein the selection is based on the received reference signal, and wherein the second precoder mode results in a compressed delay spread relative to another delay spread of the first precoder mode;

means for changing the first CP length to a second CP length, the second CP length based on the selected second precoder mode; and means for transmitting the second signal having the second CP length over the communication channel.

19. The apparatus of claim 18, wherein the means for changing the first CP length is configured to:

use the selected second precoder mode to lookup a value indicative of the second CP length by which to change the first CP length.

20. The apparatus of claim 18, further comprising:

means for transmitting information indicating the change to a receiver of the first signal after changing the first CP length.

21. The apparatus of claim 18, further comprising:

means for transmitting information indicating the second precoder mode to a receiver of the first signal after selecting the second precoder mode.

22. The apparatus of claim 18, wherein the second signal is precoded using the second precoder mode.

23. A non-transitory computer-readable medium storing computer-executable code comprising instructions configured to:

transmit a first signal having a first cyclic prefix (CP) length over a communication channel, wherein the first CP length is based on a first precoder mode;

receive a reference signal indicating a condition of the communication channel;

select a second precoder mode for transmission of a second signal, wherein the selection is based on the received reference signal, and wherein the second precoder mode results in a compressed delay spread relative to another delay spread of the first precoder mode;

change the first CP length to a second CP length, the second CP length based on the selected second precoder mode; and transmit the second signal having the second CP length over the communication channel.

24. The non-transitory computer-readable medium of claim 23, wherein the change of the first CP length comprises:

using the selected second precoder mode to lookup a value indicative of the second CP length by which to change the first CP length.

25. The non-transitory computer-readable medium of claim 23, wherein the instructions are further configured to:

transmit information indicating the change to a receiver of the first signal after changing the first CP length.

26. The non-transitory computer-readable medium of claim 23, wherein the instructions are further configured to:

transmit information indicating the selected second precoder mode to a receiver of the signal after selecting the second precoder mode.

27. The non-transitory computer-readable medium of claim 23, wherein the second signal is precoded using the second precoder mode.

* * * * *